(12) United States Patent
Matsuzawa et al.

(10) Patent No.: US 10,095,713 B2
(45) Date of Patent: Oct. 9, 2018

(54) INFORMATION DEVICE, SERVER, RECORDING MEDIUM WITH IMAGE FILE RECORDED THEREON, IMAGE FILE GENERATING METHOD, IMAGE FILE MANAGEMENT METHOD, AND COMPUTER READABLE RECORDING MEDIUM

(71) Applicant: OLYMPUS CORPORATION, Tokyo (JP)

(72) Inventors: Yoshinori Matsuzawa, Hachioji (JP); Sumio Kawai, Hachioji (JP); Kazuhiro Sato, Sagamihara (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 445 days.

(21) Appl. No.: 14/304,429

(22) Filed: Jun. 13, 2014

(65) Prior Publication Data
US 2014/0372390 A1 Dec. 18, 2014

(30) Foreign Application Priority Data
Jun. 14, 2013 (JP) .................................. 2013-126115

(51) Int. Cl.
G06F 17/30 (2006.01)
(52) U.S. Cl.
CPC .... G06F 17/3028 (2013.01); G06F 17/30274 (2013.01)
(58) Field of Classification Search
CPC .......... G06F 17/30244; G06F 17/3028; G06F 17/30274
(Continued)

(56) References Cited

U.S. PATENT DOCUMENTS 7,508,420 B2 3/2009 Kitajima
7,953,748 B2 5/2011 Tanaka
(Continued)

FOREIGN PATENT DOCUMENTS

JP 11-259459 9/1999
JP 2002-320185 A 10/2002
(Continued)

OTHER PUBLICATIONS

Office Action mailed in corresponding Japanese Pat. Appln. No. 2013-126115 dated Dec. 20, 2016, consisting of 5 pp. (English Translation Provided).
(Continued)

Primary Examiner — Jay A Morrison
Assistant Examiner — Ken Hoang
(74) Attorney, Agent, or Firm — Volpe and Koenig, P.C.

(57) ABSTRACT

The information device includes an imaging unit that images a subject and generates image data of the subject, a meta information generating unit that generates meta information related to the image data generated by the imaging unit, a possibility information generating unit that generates, with respect to the meta information, possibility information setting whether or not change of original information is possible by an external device when the meta information is transmitted to the external device, and an image file generating unit that generates an image file associating the image data generated by the imaging unit, the meta information generated by the meta information generating unit, and the possibility information generated by the possibility information generating unit with one another.

15 Claims, 27 Drawing Sheets

(58) Field of Classification Search
USPC ............ 345/8, 156, 419, 619, 179, 1.3, 649;
715/234, 765, 771, 201, 255, 702, 720,
715/723, 731, 738, 752, 753, 767, 768,
715/781, 784, 788, 835; 707/722, 740,
707/728, 736, 737, 738, 741, 756,
707/E17.005, 725, 746, 780, 822, 825
See application file for complete search history.

(56) References Cited

U.S. PATENT DOCUMENTS

| | | | |
|---|---|---|---|
| 8,719,329 B2 | 5/2014 | Imai | |
| 8,725,718 B2 * | 5/2014 | Inoue | G06F 17/30997 |
| | | | 707/708 |
| 2004/0252203 A1 | 12/2004 | Kitajima | |
| 2005/0021659 A1 * | 1/2005 | Pilu | G06F 17/30864 |
| | | | 709/213 |
| 2006/0242152 A1 | 10/2006 | Tanaka | |
| 2008/0162450 A1 * | 7/2008 | McIntyre | G06F 17/3028 |
| 2008/0298720 A1 * | 12/2008 | Klassen | H04N 1/00244 |
| | | | 382/298 |
| 2011/0238725 A1 * | 9/2011 | Imai | H04N 5/772 |
| | | | 709/201 |
| 2012/0158842 A1 * | 6/2012 | Brenner | H04L 67/02 |
| | | | 709/204 |
| 2013/0006983 A1 * | 1/2013 | Yamanishi | H04N 1/21 |
| | | | 707/736 |

FOREIGN PATENT DOCUMENTS

| | | |
|---|---|---|
| JP | 2004-007069 A | 1/2004 |
| JP | 2004-206345 A | 7/2004 |
| JP | 2004-234157 A | 8/2004 |
| JP | 2004-247886 A | 9/2004 |
| JP | 2005-109885 A | 4/2005 |
| JP | 2005-184642 A | 7/2005 |
| JP | 2005-236729 A | 9/2005 |
| JP | 2006-277402 A | 10/2006 |
| JP | 2010-170386 A | 8/2010 |
| JP | 2011-209942 A | 10/2011 |

OTHER PUBLICATIONS

Decision to Grant mailed in corresponding Japanese Pat. Appln. No. 2013-126115 dated Apr. 25, 2017, consisting of 5 pp. (English Translation Provided).

Office Action mailed in corresponding Japanese Patent Application No. 2017-101592 dated Mar. 13, 2018, consisting of 6 pp. (English Translation Provided).

Office Action mailed in corresponding Japanese Patent Application No. 2017-101592 dated Jul. 24, 2018, consisting of 7 pp. (English Translation Provided).

* cited by examiner

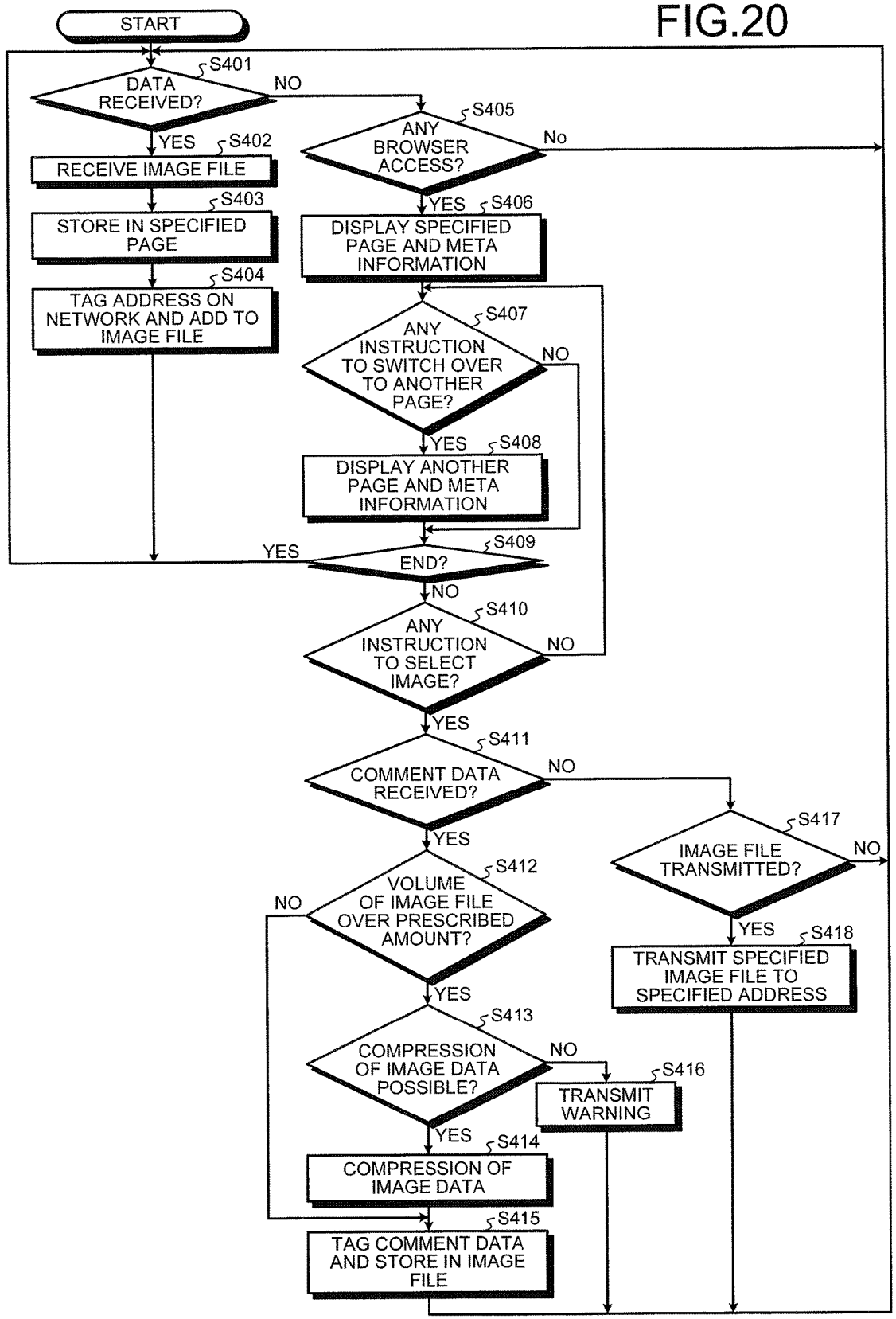

INFORMATION DEVICE, SERVER, RECORDING MEDIUM WITH IMAGE FILE RECORDED THEREON, IMAGE FILE GENERATING METHOD, IMAGE FILE MANAGEMENT METHOD, AND COMPUTER READABLE RECORDING MEDIUM

CROSS-REFERENCE TO RELATED APPLICATIONS

This application is based upon and claims the benefit of priority from Japanese Patent Application No. 2013-126115, filed on Jun. 14, 2013, the entire contents of which are incorporated herein by reference.

BACKGROUND OF THE INVENTION

1. Field of the Invention

The present invention relates to an information device that is able to transmit via a network an image file storing image data therein, a server that receives the image file transmitted from the information device and that is accessible from a portable device, a recording medium recording therein the image file, an image file generating method, an image file management method, and a computer readable recording medium.

2. Description of the Related Art

In recent years, a technique of sharing among users a plurality of document files recording therein document data by causing a management server to unitarily manage the plurality of documents is known (see, for example, Japanese Laid-open Patent Publication No. 11-259459). In this technique, the management server manages a document file associating a history record indicating contents of operations operated with respect to the document data with the document data.

SUMMARY OF THE INVENTION

In accordance with some embodiments, an information device, server, recording medium with image file recorded thereon, image file generating method by the information device, image file management method by the server, and computer readable recording medium are presented.

In some embodiments, an information device communicatable via a network is presented. The information device includes: an imaging unit that images a subject and generates image data of the subject; a meta information generating unit that generates meta information related to the image data generated by the imaging unit; a possibility information generating unit that generates, with respect to the meta information, possibility information setting whether or not change of original information is possible by an external device when the meta information is transmitted to the external device; and an image file generating unit that generates an image file associating the image data generated by the imaging unit, the meta information generated by the meta information generating unit, and the possibility information generated by the possibility information generating unit with one another.

In some embodiments, an information device that is able to communicate via a network an image file including image data is presented. The information device includes a possibility information generating unit. The possibility information generates: additional information that is additionally recordable by an external device when the image file is transmitted to the external device via the network; and resize limitation information for resizing of the image data.

In some embodiments, a server that is able to receive via a network an image file from an external device is presented. The server includes: a recording unit that records therein the image file received from the external device; a display control unit that causes, when an instruction signal instructing browsing of the image file is input from another external device different from the external device, the another external device to display a plurality of pieces of meta information and an image corresponding to image data; a meta information adding unit that additionally records, if additional data related to the image data are received from the another external device, the additional data into the image file as new meta information; a data size determination unit that determines, when the meta information adding unit additionally records the new meta information into the image file, whether or not a volume of the image file exceeds a prescribed amount set beforehand; and a resizing unit that compresses the image data, if the data size determination unit determines that the prescribed amount is exceeded.

In some embodiments, a recording medium having an image file recorded therein is presented. The image file stores therein image data and a plurality of pieces of meta information related to the image data in association with each other. The image file has a prescribed volume. The plurality of pieces of meta information include: a plurality of pieces of additional change information that are additionally recordable with new information or changeable in its original information by an external device; and possibility information setting whether or not the additional recording of the new information or change in its original information by the external device is possible.

In some embodiments, a recording medium having recorded therein an image file storing therein image data and meta information related to the image data in association with each other is presented. The meta information includes possibility information prohibiting, when after the image file is transmitted via a network to an external device, the external device adds additional data thereto, and the external device adjusts, according to the meta information, a file size of the image file upon shooting, a volume of the image file including the additional data from exceeding a prescribed amount set beforehand.

In some embodiments, an image file generating method executed by an information device communicatable via a network is presented. The method includes: imaging a subject and generating image data of the subject; generating meta information related to the image data; generating, with respect to the meta information, possibility information setting whether or not additional recording of new information or change in its original information is possible by an external device when the meta information is transmitted to the external device; and generating the image file associating the image data, the meta information, and the possibility information with one another.

In some embodiments, an image file generating method executed by an information device that is communicatable via a network and that generates an image file is presented. The image file generating method includes: imaging a subject and generating image data of the subject; generating possibility information including addable information that is additionally recordable in the image file by an external device when the image file is transmitted via the network to the external device, and resize limitation information for resizing of the image data by the external device when new information is additionally recorded in the image file; and generating the image file by associating the image data with the possibility information.

In some embodiments, an image file management method executed by a server that is able to receive an image file from an external device via a network is presented. The image file management method includes: recording the image file received from the external device; causing, when an instruction signal instructing browsing of the image file is input from another external device different from the external device, the another external device to display a plurality of pieces of meta information and an image corresponding to image data; additionally recording, if additional data related to the image data are received from the another external device, the additional data into the image file as new meta information; determining, when the new meta information is additionally recorded into the image file, whether or not a volume of the image file exceeds a prescribed amount set beforehand; and compressing the image data if the prescribed amount is determined to be exceeded.

In some embodiments, a non-transitory computer readable recording medium with an executable program stored thereon is presented. The program instructs a processor provided in an information device communicatable via a network to execute: imaging a subject and generating image data of the subject; generating meta information related to the image data; generating, with respect to the meta information, possibility information setting whether or not additional recording of new information or change in its original information is possible by an external device when the meta information is transmitted to the external device; and generating an image file associating the image data, the meta information, and the possibility information.

In some embodiments, a non-transitory computer readable recording medium with an executable program stored thereon is presented. The program instructs a processor provided in an information device that is communicatable via a network and that generates an image file to execute: imaging a subject and generating image data of the subject; generating possibility information including addable information that is additionally recordable in the image file by an external device when the image file is transmitted via the network to the external device, and resize limitation information for resizing of the image data by the external device when new information is additionally recorded in the image file by the external device; and generating the image file by associating the image data with the possibility information.

In some embodiments, a non-transitory computer readable recording medium with an executable program stored thereon is presented. The program instructs a processor provided in a server that is able to receive an image file from an external device via a network to execute: recording the image file received from the external device; causing, when an instruction signal instructing browsing of the image file is input from another external device different from the external device, the another external device to display a plurality of pieces of meta information and an image corresponding to image data; additionally recording, if additional data related to image data are received from the another external device, the additional data into the image file as new meta information; determining, when the new meta information is additionally recorded into the image file, whether or not a volume of the image file exceeds a prescribed amount set beforehand; and compressing the image data if the prescribed amount is determined to be exceeded.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 20 is a flow chart illustrating an outline of a process executed by the SNS server according to the first embodiment;

DETAILED DESCRIPTION OF THE PREFERRED EMBODIMENTS

Hereinafter, embodiments of the present invention (hereinafter, referred to as "embodiments") will be described. The present invention is not limited by the following embodiments. Further, hereinafter, description will be made by appending the same symbols to the same configurations.

First Embodiment

Figure 1:
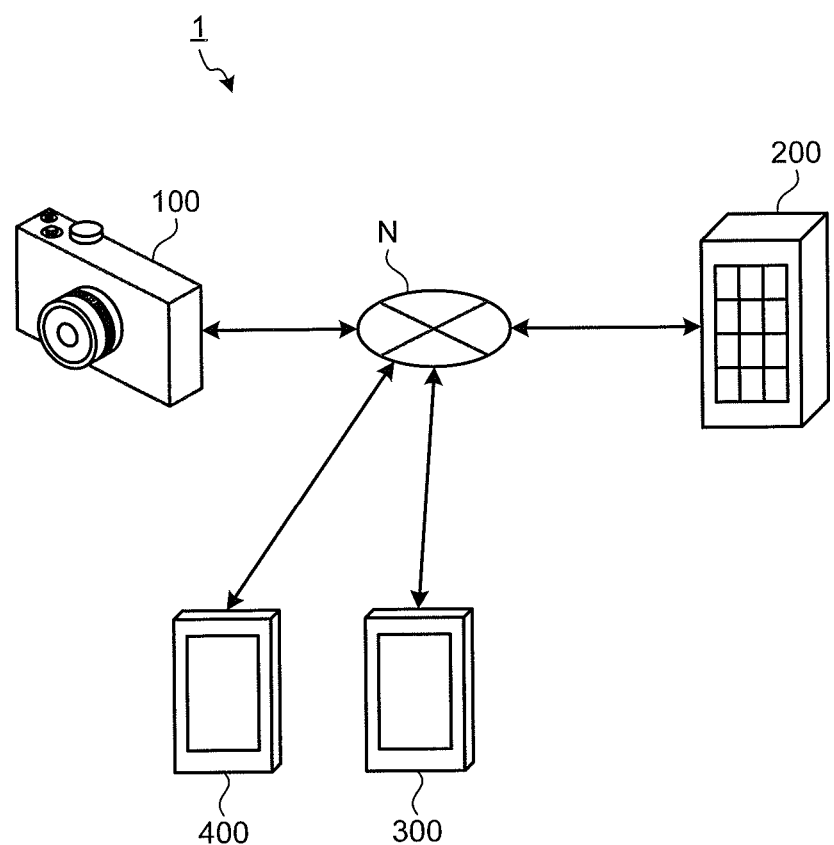
FIG. 1 is a schematic diagram schematically illustrating a configuration of an image browsing system according to a first embodiment.

FIG. 1 is a schematic diagram schematically illustrating a configuration of an image browsing system according to a first embodiment.

An image browsing system 1 illustrated in FIG. 1 includes: an imaging apparatus 100 that transmits to outside, via a network "N" with a prescribed communication speed, an image file including image data; an SNS server 200 that receives the image file transmitted from the imaging apparatus 100 via the network "N" and transmits, according to a device accessed via the network "N", information such as the image data and contents data; and a portable device 300 and a portable device 400 that are able to access the SNS server 200 via the network "N". Hereinafter, description will be made by referring to any of the portable device 300 and portable device 400 as "portable device 300". Further, in the first embodiment, the imaging apparatus 100 functions as an information device.

Figure 2:
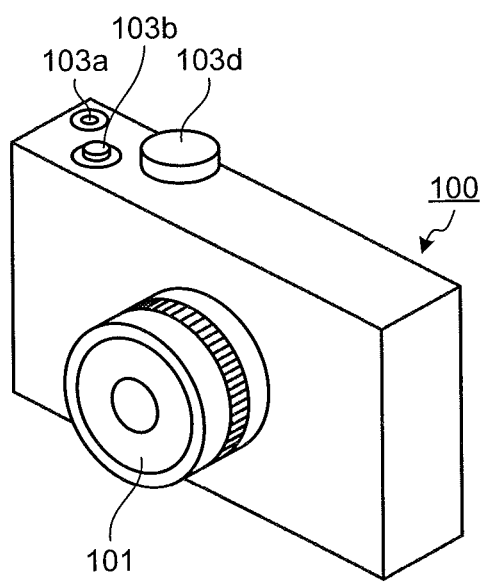
FIG. 2 is a perspective diagram illustrating a configuration of a subject facing side of an imaging apparatus according to the first embodiment.
Figure 3:
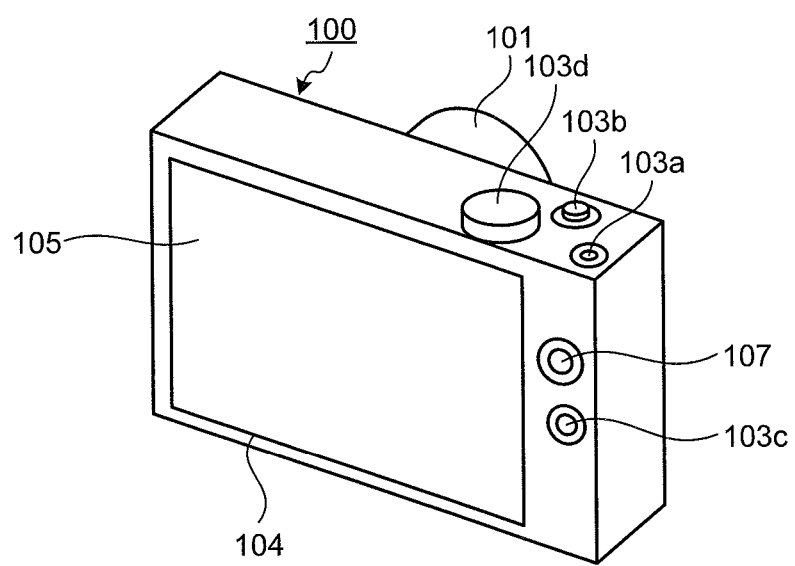
FIG. 3 is a perspective diagram illustrating a configuration of a shooter facing side of the imaging apparatus according to the first embodiment.
Figure 4:
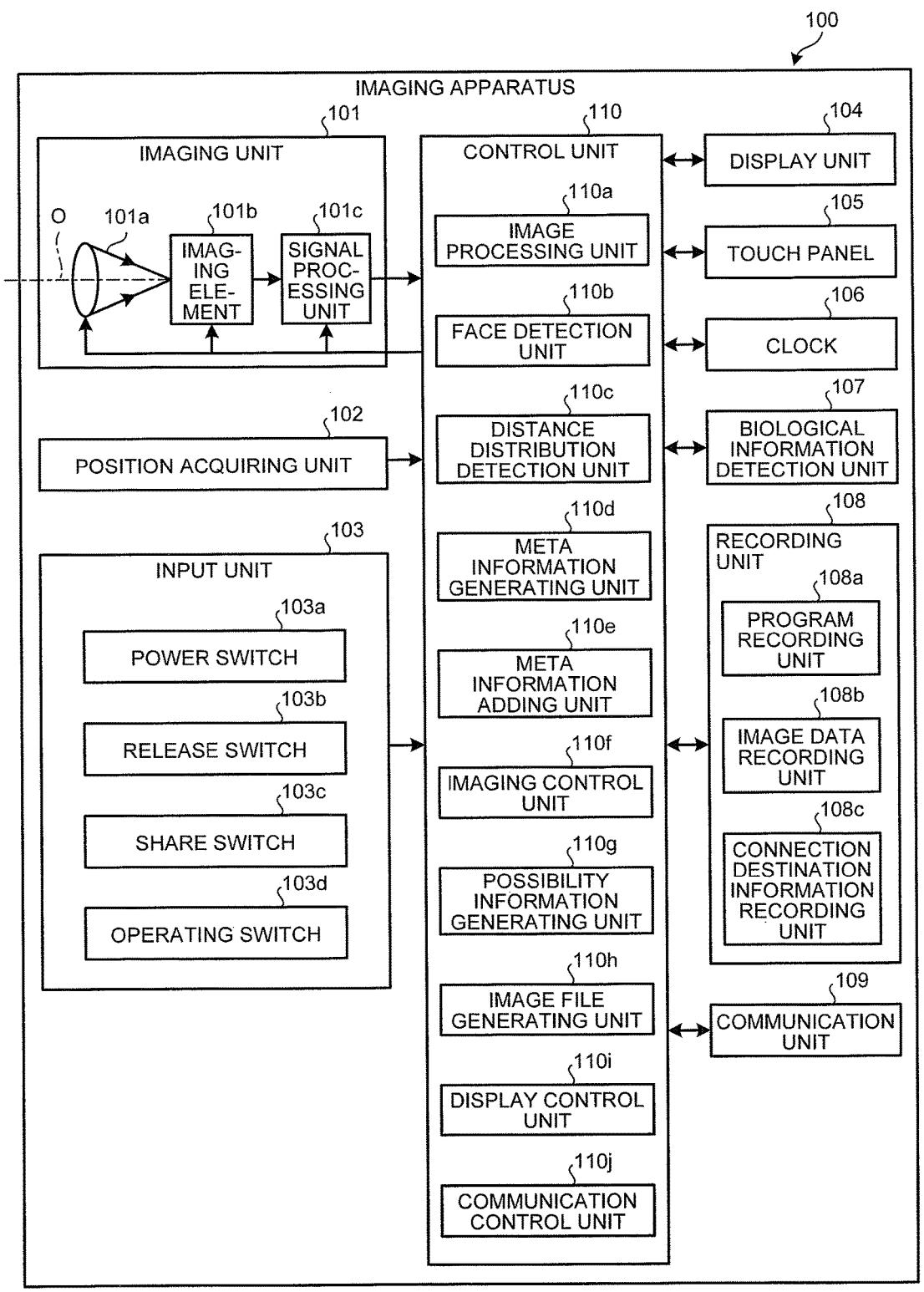
FIG. 4 is a block diagram illustrating a functional configuration of the imaging apparatus according to the first embodiment.

First, the imaging apparatus 100 will be described. FIG. 2 is a perspective diagram illustrating a configuration of a subject facing side (front side) of the imaging apparatus 100. FIG. 3 is a perspective diagram illustrating a configuration of a shooter facing side (back side) of the imaging apparatus 100. FIG. 4 is a block diagram illustrating a functional configuration of the imaging apparatus 100.

The imaging apparatus 100 illustrated in FIG. 2 to FIG. 4 includes: an imaging unit 101, a position acquiring unit 102, an input unit 103, a display unit 104, a touch panel 105, a clock 106, a biological information detection unit 107, a recording unit 108, a communication unit 109, and a control unit 110.

The imaging unit 101, under control of the control unit 110, images a subject, generates image data of the subject, and outputs the image data to the control unit 110. The imaging unit 101 has an optical system 101a, an imaging element 101b, and a signal processing unit 101c.

The optical system 101a condenses light from a predetermined field area and forms a subject image. The optical system 101a is configured by using a zoom lens with a changeable focal distance, a focus lens that adjust a focal point, a lens drive unit that moves the zoom lens and focus lens along an optical axis "O", a shutter mechanism, and a diaphragm mechanism. The optical system 101a performs, according to an instruction signal input from the control unit 110, change of the focal distance, adjustment of the focal point, change of a diaphragm value, and setting of a shutter speed.

The imaging element 101b receives the subject image condensed by the optical system 101a, converts the subject image into an electric signal, and outputs the electric signal to the signal processing unit 101c. The imaging element 101b is configured by using a charge coupled device (CCD), a complementary metal oxide semiconductor (CMOS), or the like. Further, the imaging element 101b sequentially generates, according to an instruction signal input from the control unit 110, the image data at a predetermined frame rate, for example, 60 fps or 120 fps.

The signal processing unit 101c performs A/D conversion by carrying out analog processing such as a noise reduction process or gain-up process on the image data (analog signal) input from the imaging element 101b and outputs the converted image data to the control unit 110.

The position acquiring unit 102 receives orbit information of a satellite transmitted from a plurality of GPS satellites forming a global positioning system (GPS), which is means for measuring a position of an object on the ground, and based on this received orbit information, acquires position information of the imaging apparatus 100 upon shooting. The position acquiring unit 102 outputs the position information of the imaging apparatus 100 to the control unit 110. The position information is a longitude, a latitude, and time information.

The input unit 103 has: a power switch 103a that receives input of an instruction signal of power-on or power-off of the imaging apparatus 100; a release switch 103b that receives input of a release signal instructing shooting to the imaging apparatus 100; a share switch 103c that receives input of an instruction signal to transmit the image file to the SNS server 200; and an operating switch 103d that switches over settings of various parameters of the imaging apparatus 100 and modes of the imaging apparatus 100.

The display unit 104 displays a live view image corresponding to the image data generated by the imaging unit 101 or an image corresponding to the image data recorded in the recording unit 108. The display unit 104 is configured by using: a display panel made of a liquid crystal, organic electro-luminescence (EL), or the like; and a display driver or the like. Displaying an image includes: confirmation display (Rec View display) of displaying, only for a predetermined time period (for example, three seconds), image data immediately after being shot by the imaging apparatus 100; play back display of playing back the image data recorded in the recording unit 108; live view image display of sequentially displaying, along a time series, live view images corresponding to image data consecutively generated by the imaging unit 101; and the like. Further, the display unit 104 displays, as appropriate, operation information and information related to shooting of the imaging apparatus 100, for example, an exposure value, a diaphragm value, and the like.

The touch panel 105 is provided on a display screen of the display unit 104. The touch panel 105 detects a touch position of a finger, a touch pen, or any other external object, and outputs a position signal corresponding to this detected touch position. Further, the touch panel 105 detects a position touched by the shooter or a user based on information displayed by the display unit 104 and receives input of an instruction signal instructing an operation to be performed by the imaging apparatus 100 according to this detected touch position.

The clock 106 has a function of measuring time and a function of determining a shooting date. The clock 106 outputs date and time data to the control unit 110 in order to add the date and time data to the image data generated by the imaging unit 101.

The biological information detection unit 107 is provided on a lateral side at a back side of the imaging apparatus 100 and detects biological information of the shooter when the image data is generated by using the imaging apparatus 100. Specifically, the biological information detection unit 107 detects biological information of the shooter, such as a fingerprint, veins, or a muscle electric current, which allows personal authentication. The biological information detection unit 107 is configured by using a biological detection sensor that detects biological information allowing personal authentication, such as a fingerprint detection sensor, a vein detection sensor, a muscle electric current detection sensor, or the like. The biological information detection unit 107 may be an imaging unit such as a compact camera having a face determination function for shooting a face of a shooter and detecting a feature point of this face.

The recording unit 108 records therein various programs for operating the imaging apparatus 100, and various data, parameters, and the like to be used during execution of the programs. The recording unit 108 is configured by using a semiconductor memory such as a flash memory or a dynamic random access memory (DRAM). The recording unit 108 has a program recording unit 108a, an image data recording unit 108b, and a connection destination information recording unit 108c. The program recording unit 108a records therein a program executed by the imaging apparatus 100.

The image data recording unit 108b records therein an image file associating: image data; image processing information for developing the image data; imaging information on imaging of the image data; and a thumbnail image data, with one another.

Figure 5:
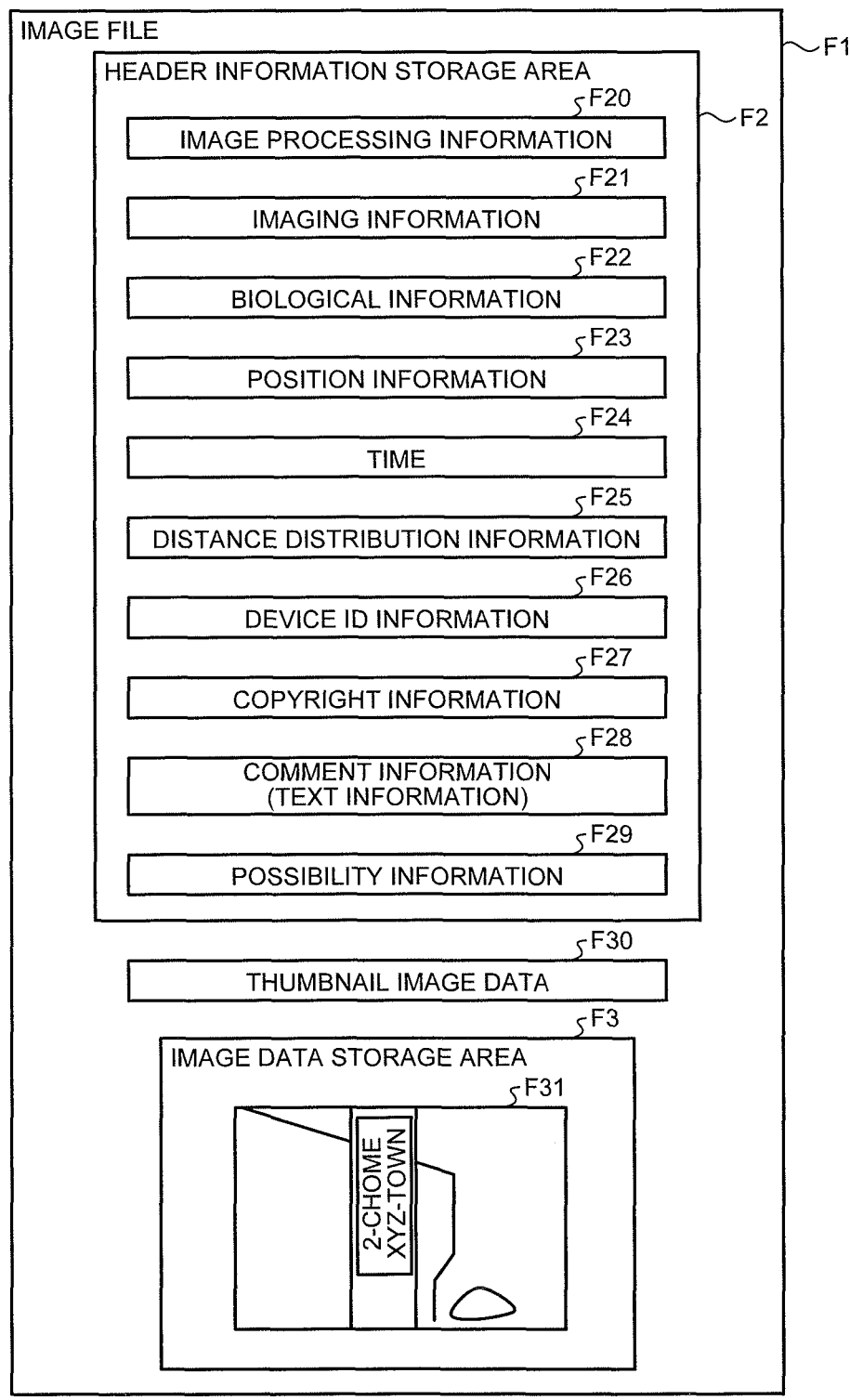
FIG. 5 is a schematic diagram illustrating an example of a structure of an image file recorded in a recording unit of the imaging apparatus according to the first embodiment.

A structure of the image file recorded in the image data recording unit 108b will now be described in detail. FIG. 5 is a schematic diagram illustrating an example of the structure of the image file.

An image file F1 illustrated in FIG. 5 has a header information storage area F2 that stores therein meta information of image data (meta information) as header information in a format compliant to the exchangeable image file format (Exif) and an image data storage area F3 that stores therein the image data. Further, in the image file F1, thumbnail image data F30 (JPEG format) of the image data are recorded.

In the header information storage area F2, at least image processing information F20, imaging information F21, biological information F22, position information F23, time F24, distance distribution information F25, device ID information F26, copyright information F27, comment information F28, and possibility information F29 are stored (recorded) as meta information. The meta information includes: additional change information that is able to be additionally recorded with new information or changed in its original information by another external device; and possibility information that sets whether or not the additional recording of the new information or change in the original information by the another external device is possible. Specifically, the additional change information is the image processing information F20, the imaging information F21, the biological information F22, the position information F23, the time F24, the distance distribution information F25, the device ID information F26, the copyright information F27, and the comment information F28. The possibility information is the possibility information F29.

The image processing information F20 records therein an image processing parameter for developing the image data.

The imaging information F21 records therein a focal distance, a focal position, a diaphragm value, an exposure value, an ISO sensitivity, a data size of image data, a white balance, a shutter speed, and the like of the imaging unit 101 upon imaging of the image data by the imaging apparatus 100.

The biological information F22 records therein biological information of the shooter or the subject detected by the biological information detection unit 107.

The position information F23 records therein the position information acquired by the position acquiring unit 102.

The time F24 records therein a shooting time at which the imaging apparatus 100 images the image data.

The distance distribution information F25 records therein a distribution of distance of a predetermined pixel row of the image corresponding to the image data, the distance being from the imaging apparatus 100 to the subject.

The device ID information F26 records therein device identification information, a manufacturing number, and the like, which represent identification information of the imaging apparatus 100.

The copyright information F27 records therein information on an owner of the imaging apparatus 100.

The comment information F28 records therein: text data such as a title of an image or a comment, which is displayed on a news feed when the image file F1 is transmitted to the SNS server 200 or the like; related image data related to the image displayed on the news feed; and advertisement information, an icon, and the like, which are associated with the image displayed on the news feed.

The possibility information F29 records therein: prohibition information related to a state of a prohibition flag that sets whether or not additional recording of new information or change, with respect to each meta information in the header information storage area F2 and image data storage area F3, by the portable device 300 when the image file is transmitted to the SNS server 200 is possible; information related to possibility of resizing of the image data; and resize limitation information (for example, resize limitation information, an image data compressibility, and a reduction rate of the image data) of the image data upon resizing of the image data by the SNS server 200 and/or portable device 300.

In the image data storage area F3, the image data F31 are stored. In FIG. 5, in order to simplify the description, schematic illustration is made by using an image corresponding to the image data of the image data F31, but in the actual image data F31, a data row of the image data is stored.

As described, according to a format illustrated in FIG. 5, the image file F1 is recorded in the image data recording unit 108b.

Returning to FIG. 4, the description of the configuration of the imaging apparatus 100 will be continued.

The connection destination information recording unit 108c records therein: identification information (IP address) of the imaging apparatus 100 necessary in performing wireless communications with the SNS server 200 via the network "N", a password corresponding to the identification information, an account for transmitting the image file to the SNS server 200, an IP address of the SNS server 200, and the like.

The communication unit 109 transmits the image file by performing wireless communications with the SNS server 200, according to predetermined wireless communication standards. The predetermined wireless communication standards are IEEE 802.11b, IEEE 802.11n, and the like. In this embodiment, any of the wireless communication standards is applicable. The communication unit 109 is configured by using a communication device for performing bidirectional communications of various information such as the image file and the contents data with the SNS server 200 via the network "N". The communication device is configured of an antenna that transmits and receives a radio signal to and from another device, a transmitting and receiving circuit that performs a demodulation process on the signal received by the antenna and a modulation process on a signal transmitted, and the like. Further, the communication unit 109 periodically transmits a communication signal including identification information (device ID) informing a presence thereof when the imaging apparatus 100 is activated. Further, the communication unit 109 receives the communication signal transmitted from the SNS server 200 to return from a stop state or standby state and establishes communications with the SNS server 200. Furthermore, the communication unit 109 returns from the stop state or standby state if the mode of the imaging apparatus 100 is switched over, for example, from the shooting mode to the playback mode or communication mode. The communication unit 109 may be provided in a recording medium, such as a memory card, which is inserted from outside of the imaging apparatus 100. Further, the communication unit 109 may be provided in an accessory attached to the imaging apparatus 100 via a hot shoe.

The control unit 110 comprehensively controls operations of the imaging apparatus 100 by performing transfer or the like of instructions and data corresponding to respective units forming the imaging apparatus 100 according to the instruction signal input from the input unit 103, the position signal input from the touch panel 105, or the like. The control unit 110 is configured by using a central processing unit (CPU) or the like.

A detailed configuration of the control unit 110 will now be described. The control unit 110 has: an image processing unit 110a; a face detection unit 110b; a distance distribution detection unit 110c; a meta information generating unit 110d; a meta information adding unit 110e; an imaging control unit 110f; a possibility information generating unit 110g; an image file generating unit 110h; a display control unit 110i; and a communication control unit 110j.

The image processing unit 110a acquires the image data generated by the imaging unit 101 or the image data (RAW data or compressed image data) recorded in the recording unit 108, and generates image data (processed image data) obtained by performing various image processing on the acquired image data. The image processing unit 110a is configured by using an image processing engine.

The face detection unit 110b detects, by pattern matching, a face of a person included in an image corresponding to the image data generated by the imaging unit 101. Specifically, after detecting a position of the face in the image by using the pattern matching, the face detection unit 110b detects positions of features of the face, such as eyes, a nose, a mouth, and the like, to thereby detect the position of the face, a size (area) of the face, a direction of the face, an angle (inclination) of the face, and the like. Further, the face detection unit 110b detects sizes of the eyes, nose, mouth, and face as feature points of the face, if the face is detected in the image. The face detection unit 110b may detect a face of an animal, such as a dog or a cat, besides the face of the person. Further, the face detection unit 110b may detect the face of the person by using a known technique other than the pattern matching.

The distance distribution detection unit 110c detects distance distribution information indicating a distribution of distance from the imaging apparatus 100 to the subject with reference to a predetermined pixel row in an image corresponding to image data. Specifically, the distance distribution detection unit 110c detects the distance distribution information from the imaging apparatus 100 to the subject by detecting a distance of each of a plurality of focus points. The distance distribution information may be information acquired when focusing of the imaging apparatus 100 is performed, and even if the distance distribution information is focus point position information, the distance distribution information is relative comparison information. Further, the distance distribution detection unit 110c does not need to accurately measure a distance and may just be able to determine a perspective relation. Specifically, the distance distribution detection unit 110c may just be able to determine a landscape and a close point. Further, a poster or the like may be determined to be at a close distance rather than a long distance for detection, even if it is of a landscape. Further, the focusing is generally of a mountain climbing method or phase difference method, but a facial size information or blur information may be used.

The meta information generating unit 110d generates a plurality of pieces of meta information related to the image data generated by the imaging unit 101. Specifically, the meta information generating unit 110d generates, when the imaging unit 101 generates the image data, the imaging information of the imaging unit 101, the image processing information by the image processing unit 110a, the biological information detected by the biological information detection unit 107, the position information acquired by the position acquiring unit 102, the time from the clock 106, the distance distribution information detected by the distance distribution detection unit 110c, the device ID information, and the copyright information, as the pieces of meta information.

The meta information adding unit 110e additionally records, as comment information of the meta information, text data input via the touch panel 105 when an input screen for inputting text data is displayed on an image displayed by the display unit 104.

The imaging control unit 110f performs control to start still image operation in the imaging apparatus 100, when the release signal is input from the release switch 103b. A shooting operation in the imaging apparatus 100 refers to an operation of performing a predetermined process by the signal processing unit 101c and the image processing unit 110a on the image data output by the imaging element 101b.

The possibility information generating unit 110g generates possibility information that sets whether or not additional recording of new information or changing of original information by the portable device 300 with respect to each of the plurality of pieces of meta information when each of the plurality of pieces of meta information is transmitted to the SNS server 200 is possible. Specifically, the possibility information generating unit 110g generates possibility information setting a prohibition flag prohibiting additional recording of new information or changing of original information, with respect to a piece of meta information selected according to the selection signal selecting the piece of meta information input from the input unit 103 or the position signal input from the touch panel 105 when the display unit 104 is displaying the plurality of pieces of meta information.

The image file generating unit 110h generates the image file by associating: the meta information generated by the meta information generating unit 110d, and the image data generated by the imaging unit 101 and subjected to the predetermined process by the signal processing unit 101c and the image processing unit 110a; and the possibility information generated by the possibility information generating unit 110g, and records the image file in the image data recording unit 108b. Specifically, the image file generating unit 110h generates the image file according to the above described image file format of FIG. 5.

The display control unit 110i controls a display mode of the display unit 104. Further, the display control unit 110i causes the display unit 104 to display various information of the imaging apparatus 100.

The communication control unit 110j refers to the connection destination information recorded in the connection destination information recording unit 108c and causes the communication unit 109 to transmit the image file via the network "N" to the specified SNS server 200, if the instruction signal input from the input unit 103 and instructing the transmission of the image file to the SNS server 200 or the position signal input from the touch panel 105 is input.

Figure 6:
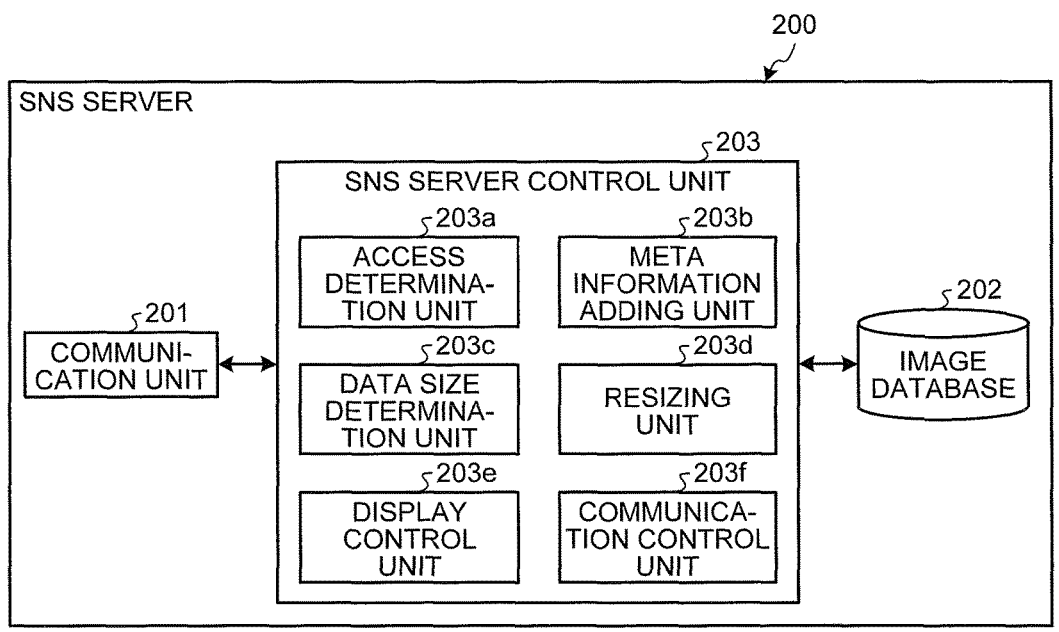
FIG. 6 is a block diagram illustrating a functional configuration of an SNS server according to the first embodiment.

Next, a configuration of the SNS server 200 will be described. FIG. 6 is a block diagram illustrating a functional configuration of the SNS server 200. In the first embodiment, the SNS server functions as a server according to an embodiment of the present invention.

The SNS server 200 illustrated in FIG. 6 includes a communication unit 201, an image database 202, and an SNS server control unit 203.

The communication unit 201 receives or transmits the image file by performing communications with any of the imaging apparatus 100 and the portable device 300, according to a predetermined communication standard.

The image database 202 records therein the image file received via the communication unit 201. The image database 202 is configured by using a recording medium such as an SDRAM, a flash memory, and a hard disk record.

The SNS server control unit 203 is configured by using a CPU or the like, and transmits, according to an access signal input from any of the imaging unit 101 and the portable device 300 via the communication unit 201, a specified page of a browser (image file). The SNS server control unit 203 has an access determination unit 203a, a meta information adding unit 203b, a data size determination unit 203c, a resizing unit 203d, a display control unit 203e, and a communication control unit 203f.

The access determination unit 203a determines a device from which the access signal has been received via the network "N" and communication unit 201. For example, the access determination unit 203a determines whether or not the access signal has been received from the portable device 300.

If additional data related to the image data are received from the portable device 300 via the network "N" and communication unit 201, the meta information adding unit 203b additionally records this additional data in the image file specified from the portable device 300. Specifically, the meta information adding unit 203b additionally records in the image file as the meta information, any of: comment data with respect to an image (specified page) corresponding to the image data of the image file specified from the portable device 300; related image data associated with the image data; network address information of the related image data associated with the image data; and advertisement information (advertisement image data or advertisement moving image data) associated with the image data.

The data size determination unit 203c determines whether or not a volume of the image file planned to be additionally recorded with new meta information by the meta information adding unit 203b will exceed a prescribed amount set beforehand if the meta information adding unit 203b is to additionally record the new meta information in the image file. This prescribed amount is set according to a communication standard with prescribed communication speed and data size.

The resizing unit 203d executes a resize process on the image data stored in the image file and stores the resized image data in the image database 202, if the data size determination unit 203c determines that the volume of the image file will exceed the prescribed amount. For example, the resizing unit 203d executes a resize process of compressing or reducing the image data stored in the image file.

The display control unit 203e controls a display mode of a specified page of a specified browser, according to the access signal input from any of the imaging unit 101 and portable device 300 via the network "N" and communication unit 201. For example, the display control unit 203e displays the image corresponding to the image data of the image file in the specified page specified according to the access signal.

The communication control unit 203f controls connection of the imaging apparatus 100 or portable device 300 accessed via the network "N" and transmits the image file in the specified image database 202.

Figure 7:
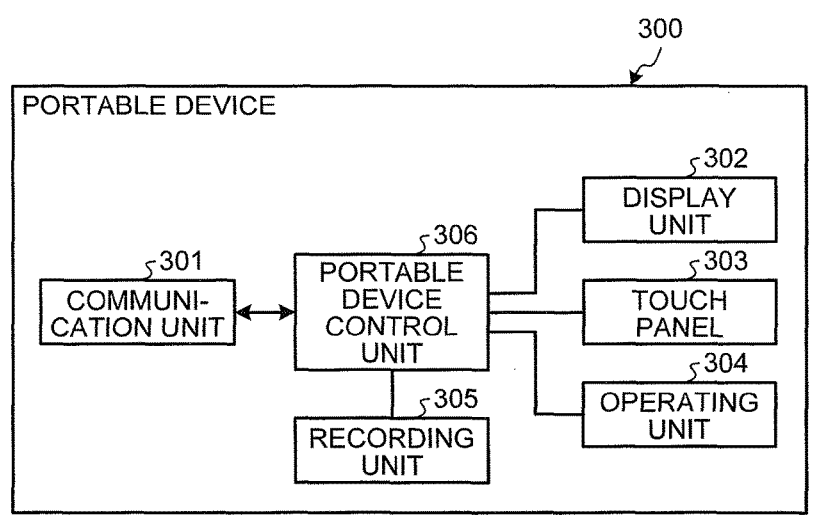
FIG. 7 is a block diagram illustrating a functional configuration of a portable device according to the first embodiment.

Next, the portable device 300 will be described. FIG. 7 is a block diagram illustrating a functional configuration of the portable device 300.

The portable device 300 illustrated in FIG. 7 includes a communication unit 301, a display unit 302, a touch panel 303, an operating unit 304, a recording unit 305, and a portable device control unit 306.

The communication unit 301 receives or transmits the image file by performing communications with any of the imaging apparatus 100 and the SNS server 200, according to a predetermined communication standard.

The display unit 302 displays the image corresponding to the image data. The display unit 302 is configured by using a display panel formed of a liquid crystal, organic EL, or the like. Further, the display unit 302 displays an image of a specified page specified when accessing the SNS server 200 via the network "N" and communication unit 301.

The touch panel 303 is provided on a display screen of the display unit 302. The touch panel 303 detects a touch of a finger, a touch pen, or any other object from outside, and outputs to the portable device control unit 306 a position signal corresponding to this detected touch position. Further, the touch panel 303 detects a position touched by a user based on information displayed by the display unit 302 and receives input of an instruction signal instructing an operation to be performed by the portable device 300 according to this detected touch position.

The operating unit 304 receives input of a selection signal selecting any of various parameters of the portable device 300 and personal authentication information. The operating unit 304 is configured by using various switches.

The recording unit 305 records therein the image data and various programs executed by the portable device 300. Further, the recording unit 305 records therein: identification information of the portable device 300 necessary in performing wireless communications with the SNS server 200; a password corresponding to the identification information; and an account, a password, and an IP address of the SNS server 200, which are for transmitting an access to the SNS server 200. The recording unit 305 is configured by using a semiconductor memory such as a flash memory or a DRAM.

The portable device control unit 306 is configured by using a CPU or the like, and comprehensively controls operations of the portable device 300 by performing transfer or the like of instructions and data corresponding to respective units forming the portable device 300 according to the positions signal input from the touch panel 303 or instruction signal input from the operating unit 304.

The portable device 400 has a configuration that is the same as that of the above described portable device 300, and thus description of the configuration of the portable device 400 will be omitted.

In the image browsing system 1 configured as described above, the image file is able to be browsed by being transmitted to the SNS server 200 by the imaging apparatus 100 via the network "N" and the portable device 300 accessing the SNS server 200.

Figure 8:
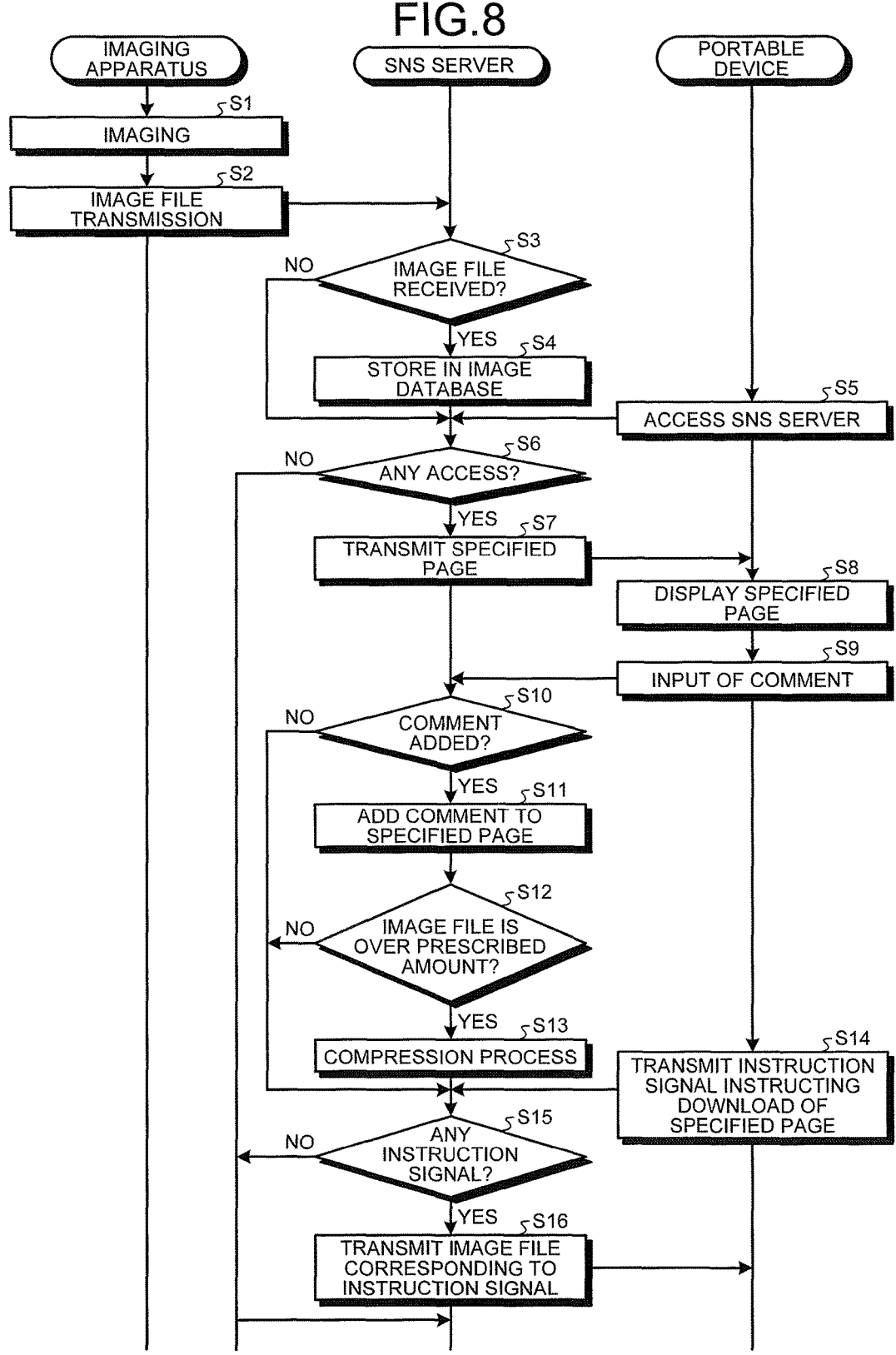
FIG. 8 is a flow chart illustrating an outline of a process executed by the image browsing system according to the first embodiment.

Next, a process executed by the image browsing system 1 will be described. FIG. 8 is a flow chart illustrating an outline of the process executed by the image browsing system 1.

In FIG. 8, first, the imaging apparatus 100 executes imaging (step S1), and transmits an image file to the SNS server 200 (step S2).

Subsequently, if the image file is received via the network "N" from the imaging apparatus 100 (step S3: Yes), the SNS server 200 stores the image file in the image database 202 (step S4). In contrast, if the SNS server 200 has not received the image file via the network "N" from the imaging apparatus 100 (step S3: No), the later described step S6 is executed.

Thereafter, the portable device 300 accesses the SNS server 200 (step S5). Specifically, the portable device 300 accesses the SNS server 200, if an icon to receive input of an instruction signal instructing to make an access to the SNS server 200 displayed by the display unit 302 is operated.

Subsequently, if there is the access from the portable device 300 (step S6: Yes), the SNS server 200 transmits to the portable device 300 a specified page according to the access from the portable device 300 (step S7). In contrast, if there is no access from the portable device 300 (step S6: No), the SNS server 200 ends this process.

Thereafter, the portable device 300 causes the display unit 302 to display the specified page transmitted from the SNS server 200 (step S8), and a comment on an image in the specified page is input via the touch panel 303 or operating unit 304 (step S9).

Figure 9:
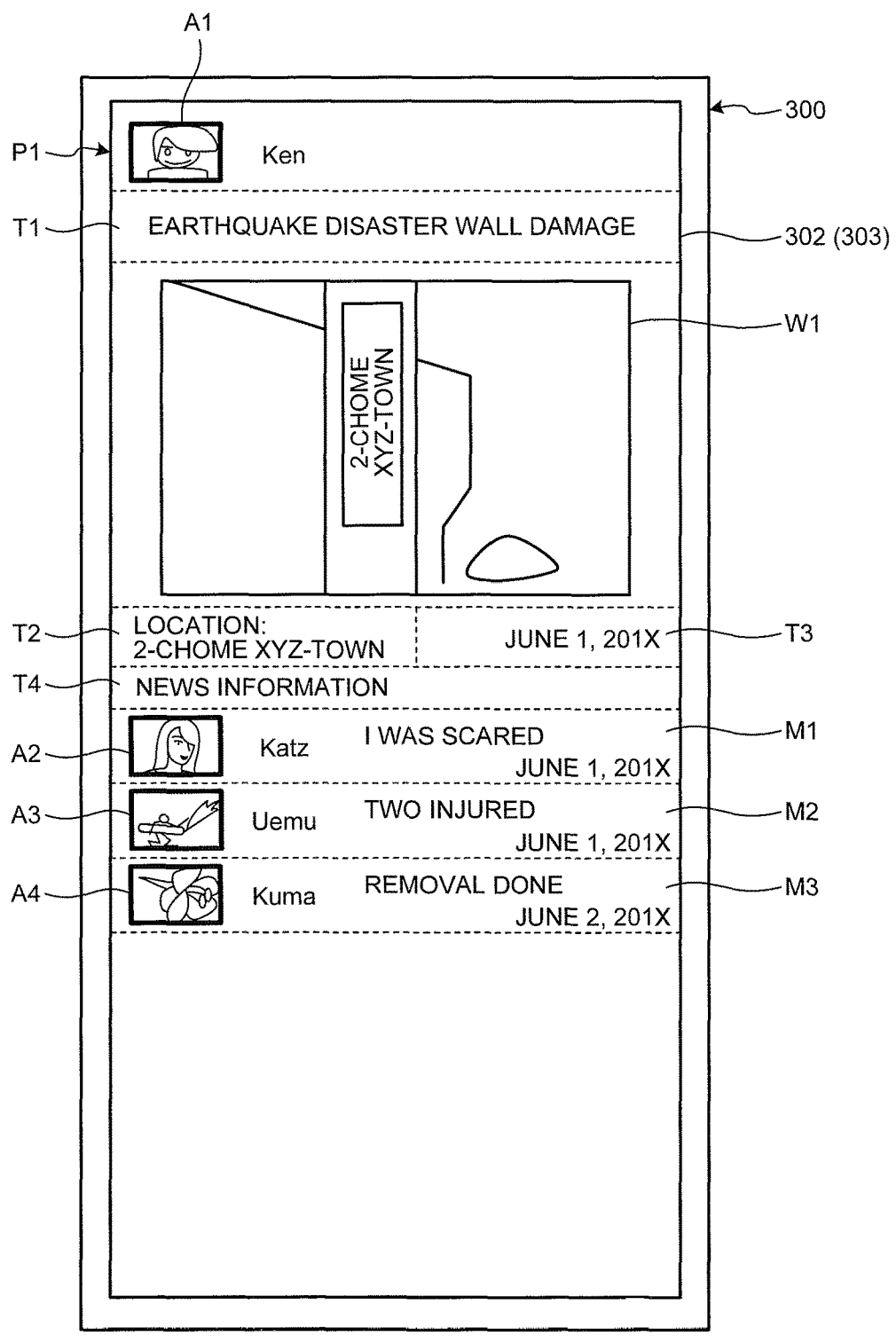
FIG. 9 is a diagram illustrating an example of a specified page displayed by a display unit of a portable device according to the first embodiment.

FIG. 9 is a diagram illustrating an example of the specified page displayed by the display unit 302 of the portable device 300. As illustrated in FIG. 9, the portable device 300 causes the display unit 302 to display the specified page P1. On the specified page P1, an image W1, a title T1 of the image W1 as meta information of an image file of the image W1, a shooting location T2 of the image W1, a shooting time T3 of the image W1 (for example, a date and a shooting time), and news information T4 where comments of other account users on the image W1 are displayed along a time series, are displayed. Further, on the specified page P1: a thumbnail image A1 of a user who has posted the image W1 to the SNS server 200; and thumbnail images A2 to A4, account names, and times at which comments M1 to M3 were additionally recorded, for the other account users who additionally recorded the comments M1 to M3 respectively in the news information T4, are displayed. The user of the portable device 300 additionally records a comment on the image W1 of the specified page P1 via the touch panel 303. In this case, if a prohibition flag prohibiting additional recording of a comment is recorded in an image file of the specified page P1, the SNS server 200 transmits to the portable device 300 a warning that comments cannot be additionally recorded.

Subsequently, if the comment is additionally recorded on the specified page from the portable device 300 (step S10: Yes), the meta information adding unit 203b additionally records the comment in the meta information of the image file corresponding to the specified page (step S11). In contrast, if no comment is additionally recorded on the specified page from the portable device 300 (step S10: No), the SNS server 200 proceeds to later described step S15.

After Step S11, if the data size determination unit 203c determines that a volume of the image file is over a prescribed amount set beforehand (step S12: Yes), the resizing unit 203d executes a compression process of image data of the image file (step S13). Thereby, the SNS server 200 is able to maintain the volume of the image file constant and thus in transmission of the image file, transmission of the image file is possible without delay. In contrast, if the data size determination unit 203c does not determine that the image file is over the capacity prescribed beforehand (step S12: No), the SNS server 200 proceeds to later described step S15.

Thereafter, the portable device 300 transmits an instruction signal instructing to download the specified page via the network "N" (step S14).

Subsequently, if the SNS server 200 receives the instruction signal from the portable device 300 (step S15: Yes), the SNS server 200 transmits to the portable device 300 an image file corresponding to the instruction signal (step S16). After step S16, the image browsing system 1 ends this process. In contrast, if the instruction signal is not received from the portable device 300 (step S15: No), the image browsing system 1 ends this process.

Figure 10:
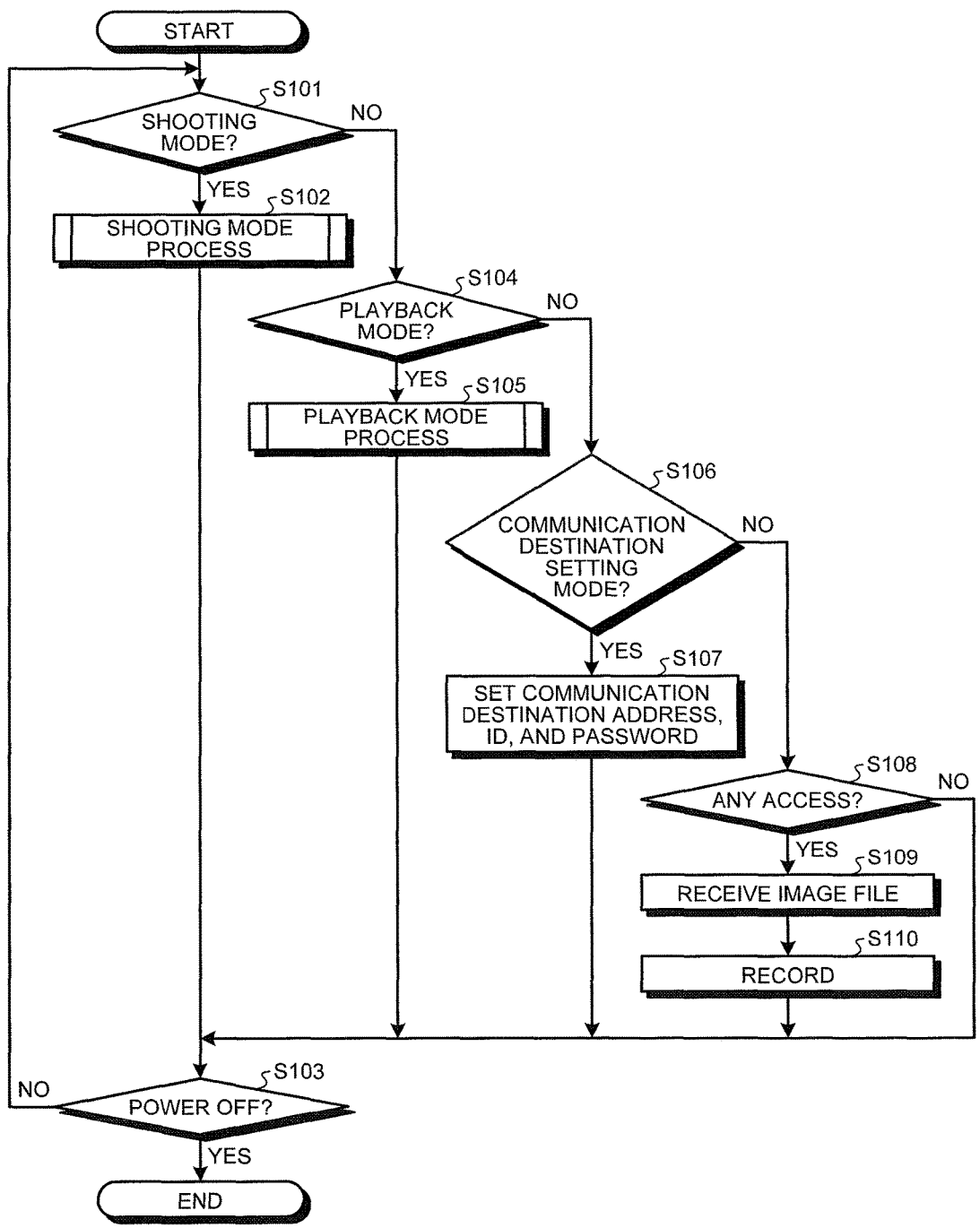
FIG. 10 is a flow chart illustrating an outline of a process executed by the imaging apparatus according to the first embodiment.

Hereinafter, respective processes of the imaging apparatus 100 and the SNS server 200 described with reference to FIG. 8 will be described in more detail. First, detailed contents of the process by the imaging apparatus 100 will be described. FIG. 10 is a flow chart illustrating an outline of the process executed by the imaging apparatus 100.

As illustrated in FIG. 10, first, a case in which the imaging apparatus 100 is set to the shooting mode (step S101: Yes) will be described. In this case, the imaging apparatus 100 executes a shooting mode process of imaging a subject and generating image data (step S102). Details of the shooting mode process will be described later.

Subsequently, if the power switch 103a is operated and power of the imaging apparatus 100 is turned off (step S103: Yes), the imaging apparatus 100 ends this process. In contrast, if the power switch 103a is not operated and the power of the imaging apparatus 100 is not turned off (step S103: No), the imaging apparatus 100 returns to step S101.

At step S101, if the imaging apparatus 100 is not set to the shooting mode (step S101: No) and the imaging apparatus 100 is set to the playback mode (step S104: Yes), the imaging apparatus 100 executes playback display of the image data stored in the image file recorded in the image data recording unit 108b or a playback mode process of transmitting the image file to the SNS server 200 (step S105). Details of the playback mode process will be described later. After step S105, the imaging apparatus 100 proceeds to step S103.

At step S101, if the imaging apparatus 100 is not set to the shooting mode (step S101: No), the imaging apparatus 100 is not set to the playback mode (step S104: No), and further the imaging apparatus 100 is set to a communication destination setting mode (step S106: Yes), the imaging apparatus 100 sets a communication destination address, an ID, and a password, according to an instruction signal input from the touch panel 105 or input unit 103 (step S107). After step S107, the imaging apparatus 100 proceeds to step S103.

At step S106, if the imaging apparatus 100 is not set to the communication destination setting mode (step S106: No), the imaging apparatus 100 proceeds to step S108.

Subsequently, if there is an access from outside via the network "N" to the imaging apparatus 100 (step S108: Yes), the imaging apparatus 100 receives an image file via the communication unit 109 (step S109), and records the image file in the image data recording unit 108b (step S110). After step S110, the imaging apparatus 100 proceeds to step S103.

At step S108, if there is no access to the imaging apparatus 100 from the outside via the network "N" (step S108: No), the imaging apparatus 100 proceeds to step S103.

Figure 11:
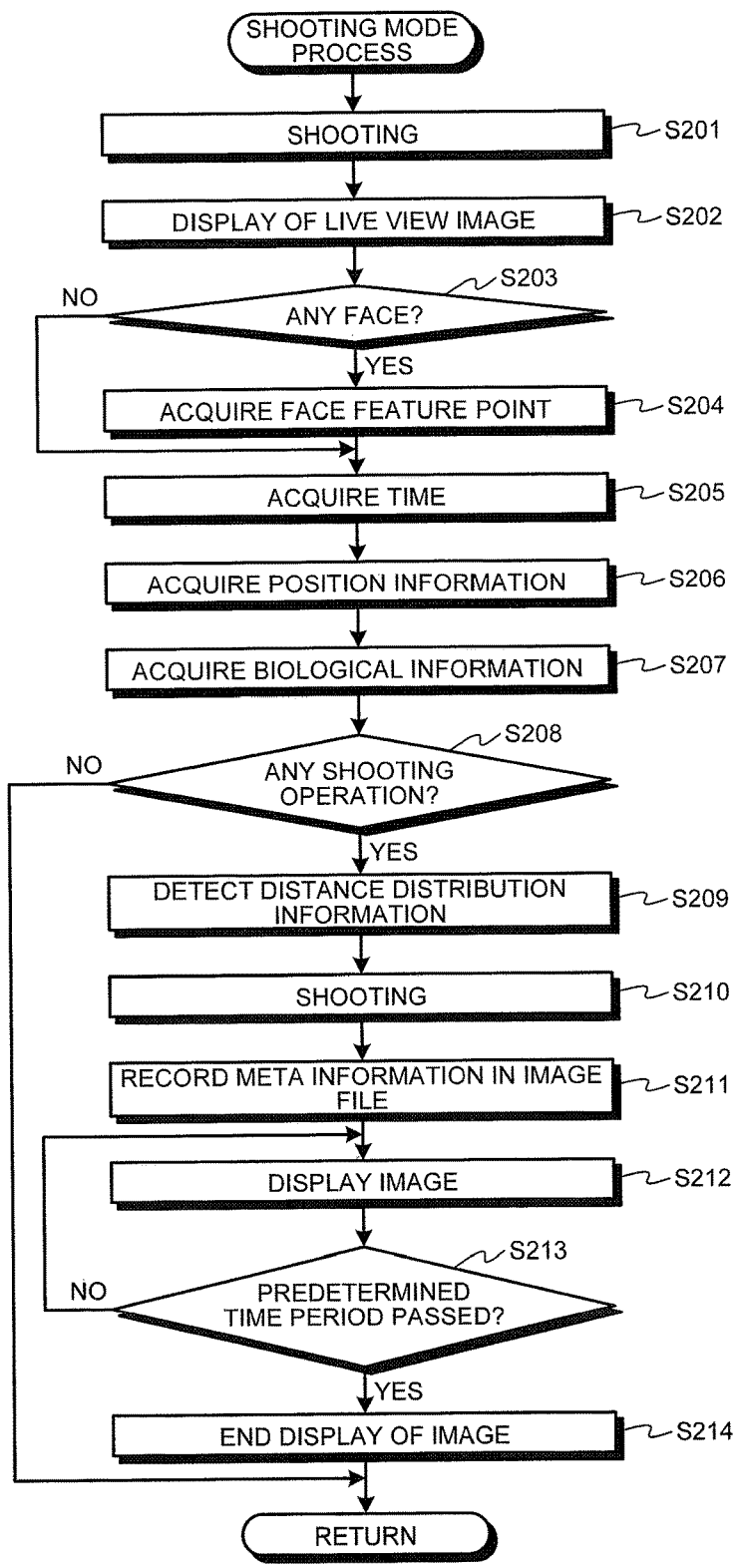
FIG. 11 is a flow chart illustrating an outline of a shooting mode process described with respect to FIG. 10.

Next, a detailed process of the shooting mode process mentioned in step S102 of FIG. 10 will be described. FIG. 11 is a flow chart illustrating an outline of the shooting mode process.

As illustrated in FIG. 11, first, the imaging control unit 110f causes the imaging unit 101 to execute shooting (step S201).

Figure 12:
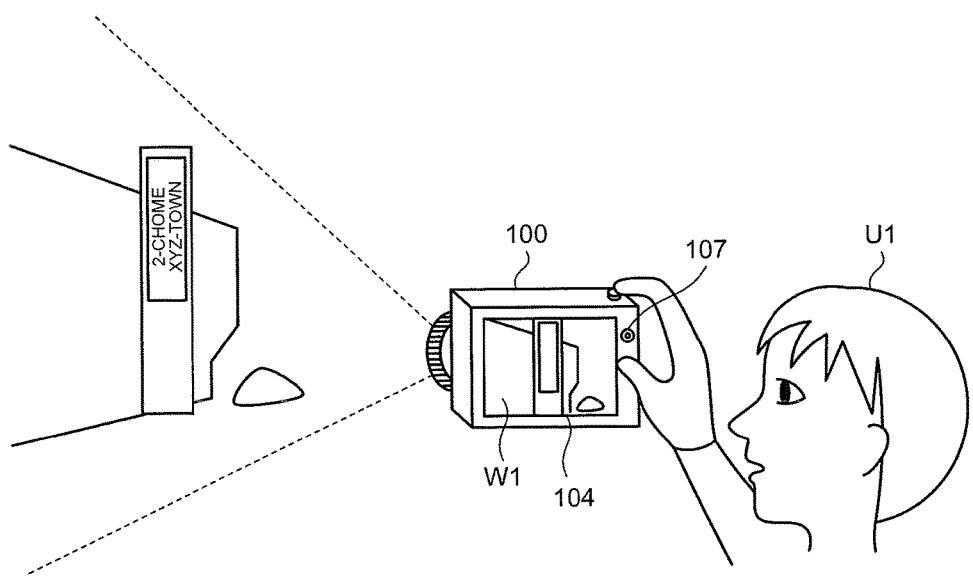
FIG. 12 is a diagram schematically illustrating a situation in which shooting is performed by using the imaging apparatus according to the first embodiment.

Subsequently, the display control unit 110i causes the display unit 104 to display a live view image corresponding to image data generated by the imaging unit 101 (step S202). In this case, as illustrated in FIG. 12, a shooter U1 performs shooting while adjusting by using the touch panel 105 or input unit 103, by checking a live view image W1 displayed by the display unit 104 of the imaging apparatus 100, any of a composition and shooting conditions with respect to a subject, for example, a diaphragm value, an exposure value, an ISO sensitivity, a white balance, a focus point position, a focal distance, a shutter speed, and a gradation.

Figure 13:
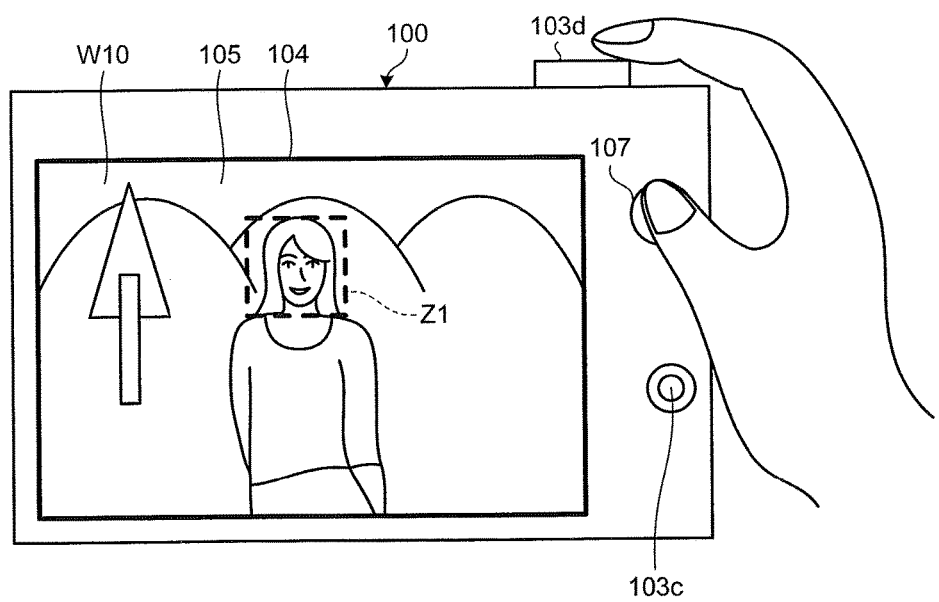
FIG. 13 is a diagram illustrating an example in which a face is detected from a live view image by a face detection unit of the imaging apparatus according to the first embodiment.

Subsequently, if the face detection unit 110b detects a face in a live view image W10 (step S203: Yes), the meta information generating unit 110d acquires a feature point of the face detected by the face detection unit 110b (step S204). For example, as illustrated in FIG. 13, if the face detection unit 110b detects a face in the live view image W10, the meta information generating unit 110d acquires a feature point of the detected face. When this is done, the display control unit 110i causes a frame Z1 corresponding to a face area including the face detected by the face detection unit 110b to be superimposed on the live view image W10 for display by the display unit 104. After step S204, the imaging apparatus 100 proceeds to step S205.

At step S203, if the face detection unit 110b does not detect a face in the live view image W10 (step S203: No), the imaging apparatus proceeds to step S205.

Subsequently, the meta information generating unit 110d acquires a time from the clock 106 (step S205), and acquires position information from the position acquiring unit 102 (step S206).

Thereafter, the meta information generating unit 110d acquires biological information of the shooter detected by the biological information detection unit 107 (step S207).

Subsequently, if there is a shooting operation by the release switch 103b being operated (step S208: Yes), the distance distribution detection unit 110c detects distance distribution information representing a distribution of distance from the imaging apparatus 100 to the subject with reference to a line in a predetermined horizontal direction of the live view image W10 (step S209).

Figure 14:
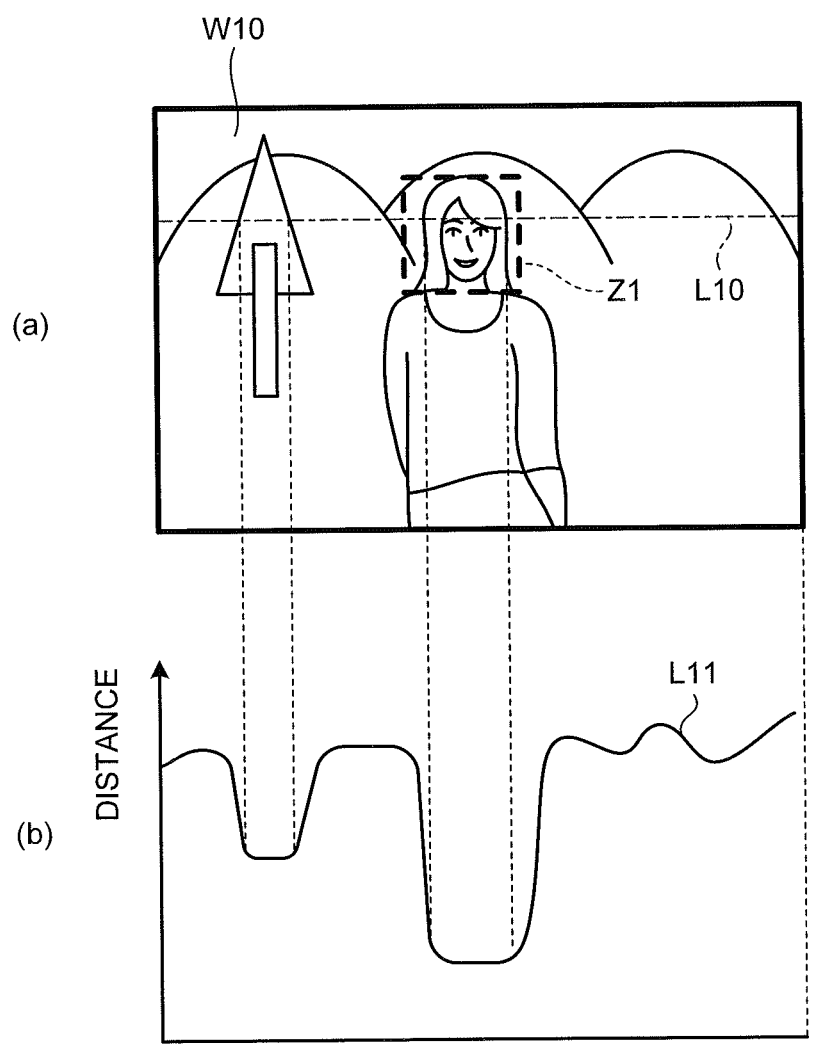
FIG. 14 is a diagram schematically illustrating an outline of a distance detection method of a distance distribution detection unit according to the first embodiment.

FIG. 14 is a diagram schematically illustrating an outline of a distance detection method of the distance distribution detection unit 110c. At (b) of FIG. 14, a vertical axis represents distance from the imaging apparatus 100 to the subject, and a horizontal axis represents positions of respective pixels on the one line (line L10) of the image.

As illustrated in FIG. 14, the distance distribution detection unit 110c detects a distance distribution from the imaging apparatus 100 to the subject by scanning one line in a predetermined horizontal direction of the live view image W10, for example, one line (pixel row) including the frame Z1 corresponding to the face area detected by the face detection unit 110b. Specifically, as illustrated in FIG. 14 at (a), the distance distribution detection unit 110c detects distance distribution information L11 ((b) of FIG. 14) from the imaging apparatus 100 to the subject, by scanning the line L10 on the live view image W10.

At step S210, the imaging control unit 110f causes the imaging unit 101 to execute shooting. Specifically, the imaging control unit 110f causes the imaging unit 101 to output image data by driving the imaging unit 101.

Subsequently, the image file generating unit 110h generates an image file associating the image data generated by the imaging unit 101 with the meta information generated by the meta information generating unit 110d and records the image file in the image data recording unit 108b (step S211).

Thereafter, the display control unit 110i causes the display unit 104 to display an image corresponding to the image data generated by the imaging unit 101 (step S212).

Subsequently, if a predetermined time period, for example, three seconds, has passed since the display unit 104 displayed the image (step S213: Yes), the imaging apparatus 100 proceeds to step S214. In contrast, if the predetermined time period has not passed since the display unit 104 displayed the image (step S213: No), the imaging apparatus 100 returns to step S212.

At step S214, the display control unit 110i causes the display of the image by the display unit 104 to be ended. After step S214, the imaging apparatus 100 returns to a main routine of FIG. 10.

At step S208, if there is no shooting operation via the release switch 103b (step S208: No), the imaging apparatus 100 returns to the main routine of FIG. 10.

Figure 15:
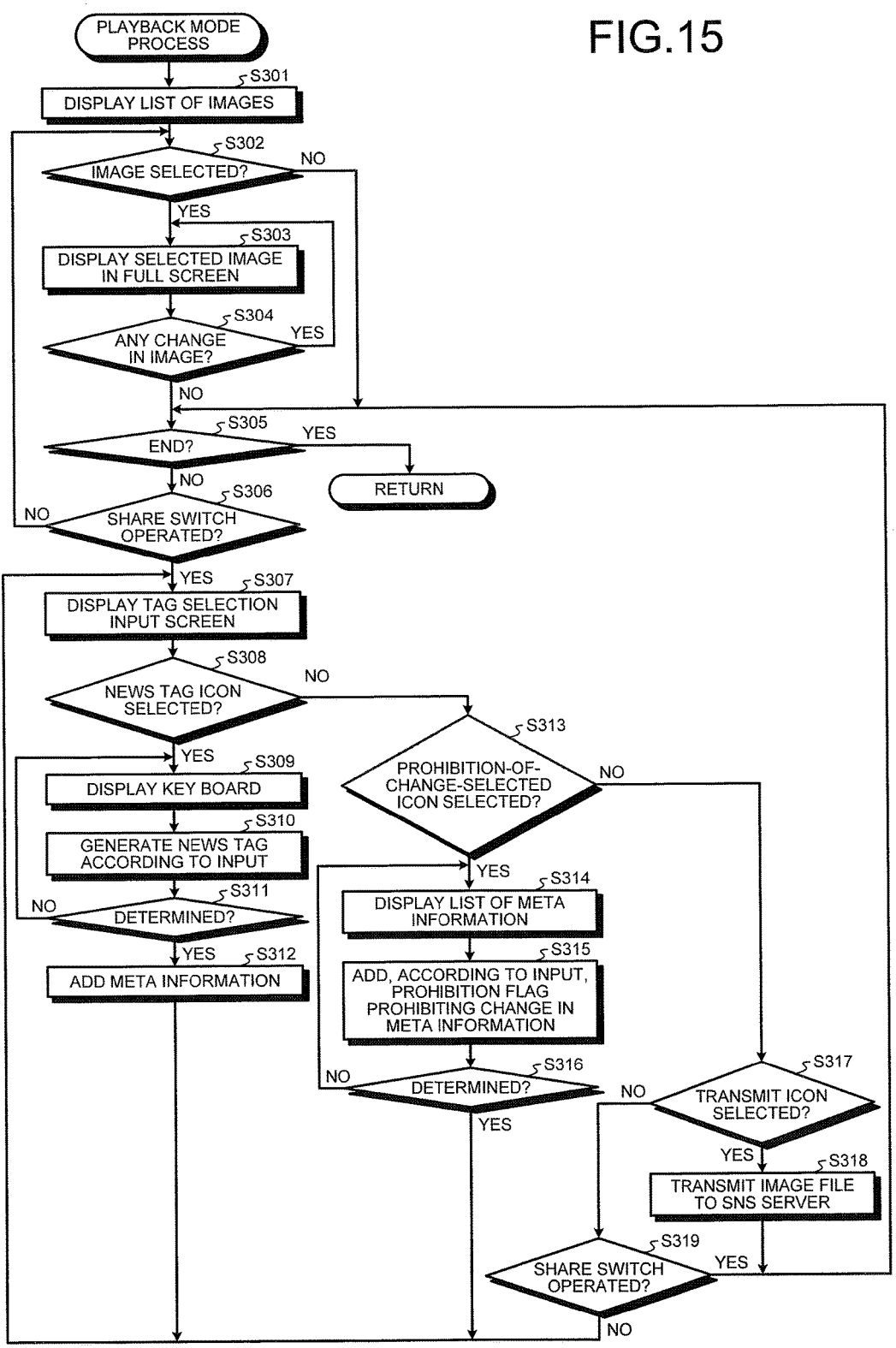
FIG. 15 is a flow chart illustrating an outline of a playback mode process described with respect to FIG. 10.

Next, a detailed process of the playback mode process mentioned in step S105 of FIG. 10 will be described. FIG. 15 is a flow chart illustrating an outline of the playback mode process.

As illustrated in FIG. 15, the display control unit 110i causes the display unit 104 to display a list of respective images of a plurality of sets of image data recorded in the image data recording unit 108b (step S301).

Subsequently, if an image is selected from the list of images displayed by the display unit 104 via the input unit 103 or touch panel 105 (step S302: Yes), the display control unit 110i causes the display unit 104 to display the selected image in full screen (step S303). After step S303, the imaging apparatus 100 proceeds to later described step S304. In contrast, if no image is selected from the list of images displayed by the display unit 104 via the input unit 103 or touch panel 105 (step S302: No), the imaging apparatus 100 proceeds to later described step S305.

At step S304, if an instruction signal instructing a change in the image displayed by the display unit 104 is input by the input unit 103 or touch panel 105 (step S304: Yes), the imaging apparatus 100 returns to step S303. In contrast, if no instruction signal instructing a change in the image displayed by the display unit 104 is input via the input unit 103 or touch panel 105 (step S304: No), the imaging apparatus 100 proceeds to step S305.

Subsequently, if an instruction signal instructing the playback mode to be ended is input from the input unit 103 (step S305: Yes), the imaging apparatus 100 returns to the main routine of FIG. 10. In contrast, if the instruction signal instructing the playback mode to be ended is not input from the input unit 103 (step S305: No), the imaging apparatus 100 proceeds to step S306.

Figure 16:
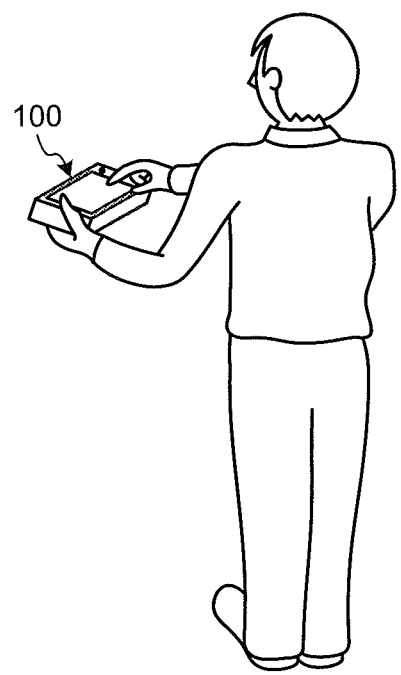
FIG. 16 is a diagram schematically illustrating a situation in which a share switch of the imaging apparatus according to the first embodiment is operated.

At step S306, the control unit 110 determines whether or not the share switch 103c is operated by the shooter. Specifically, as illustrated in FIG. 16, the control unit 110 determines whether or not an instruction signal instructing upload of the image file in order to allow browsing of the image file by another device via the SNS server 200 is input from the share switch 103c by the shooter operating the share switch 103c. If the control unit 110 determines that the share switch 103c has been operated by the shooter (step S306: Yes), the imaging apparatus 100 proceeds to later described step S307. In contrast, if the control unit 110 determines that the share switch 103c has not been operated by the shooter (step S306: No), the imaging apparatus 100 returns to step S302.

Figure 17:
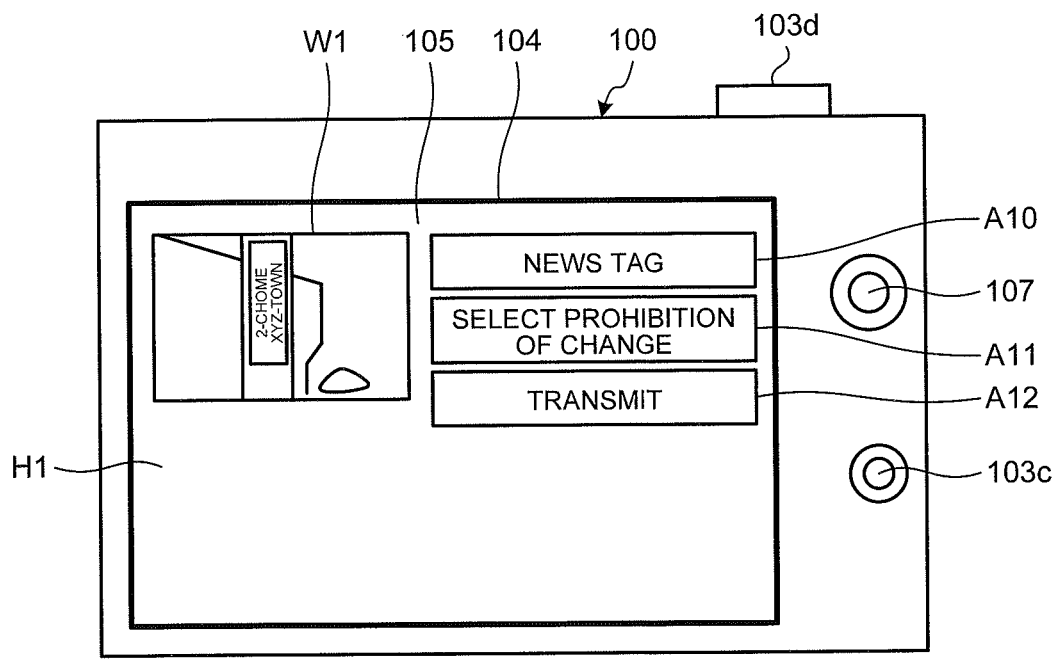
FIG. 17 is a diagram illustrating an example of a tag selection input screen displayed by the display unit of the imaging apparatus according to the first embodiment.

At step S307, the display control unit 110i causes the display unit 104 to display a tag selection input screen. Specifically, as illustrated in FIG. 17, the display control unit 110i causes the display unit 104 to display a tag selection input screen H1. In that case, the display control unit 110i causes the display unit 104 to display the selected image W1 after reducing the selected image W1. Further, the display control unit 110i causes the display unit 104 to display a news tag icon A10, a select-prohibition-of-change icon A11, and a transmit icon R12 by superimposing them on the tag selection input screen H1. The news tag icon A10 receives input of an instruction signal instructing a keyboard for inputting a title displayed in a news feed to be displayed when the image file is transmitted to the SNS server 200. The select-prohibition-of-change icon A11 receives input of an instruction signal instructing a selection screen for selecting meta information prohibiting change or additional recording from the meta information stored in the image file of the selected image W1 to be displayed. The transmit icon A12 receives input of an instruction signal for transmitting the image file of the selected image W1 to the SNS server 200.

Figure 18A:
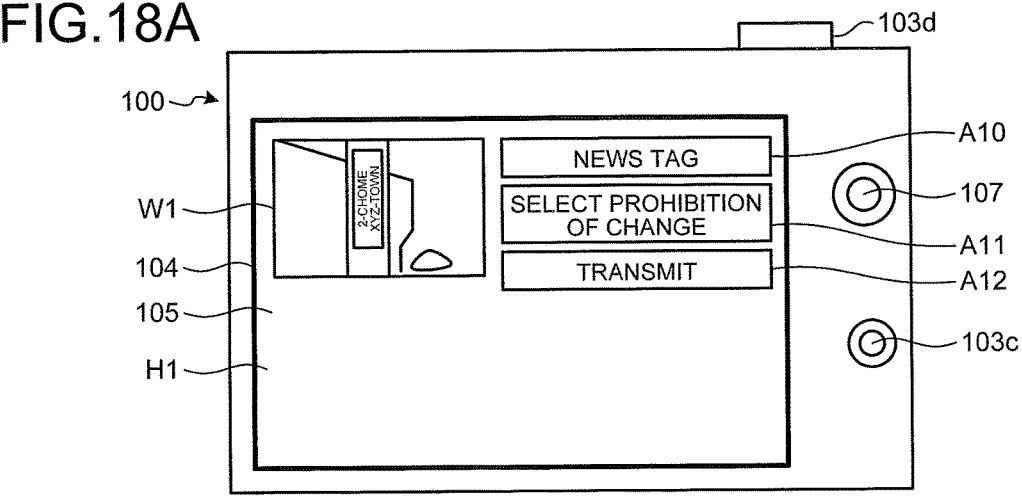
FIG. 18A is a diagram illustrating an example of a key board displayed by the display unit of the imaging apparatus according to the first embodiment.
Figure 18B:
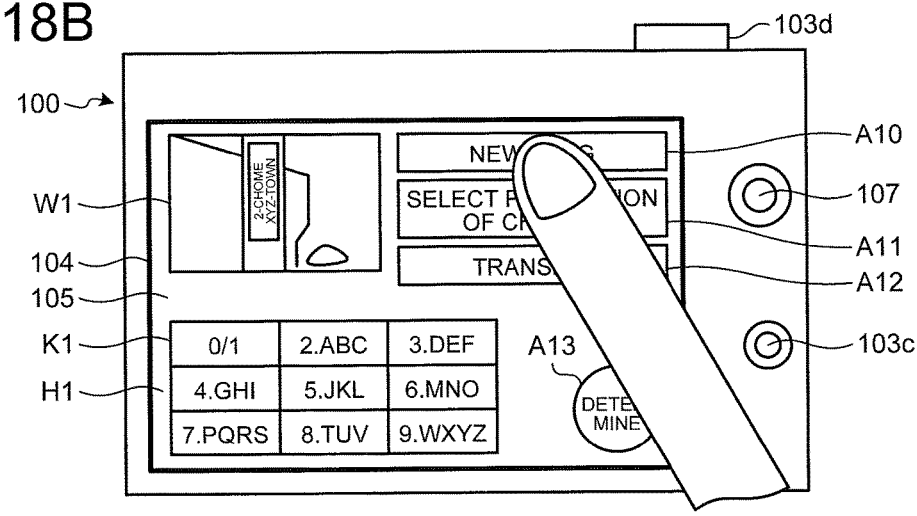
FIG. 18B is a diagram illustrating an example of the key board displayed by the display unit of the imaging apparatus according to the first embodiment.

Subsequently, if the news tag icon A10 is selected (step S308: Yes), the display control unit 110i causes the display unit 104 to perform display by superimposing a key board on the tag selection input screen H1 (step S309). Specifically, as illustrated in FIG. 18A and FIG. 18B, if the shooter touches the new tag icon A10, the display control unit 110i causes the display unit 104 to display the keyboard K1 (FIG. 18A→FIG. 18B).

Figure 18C:
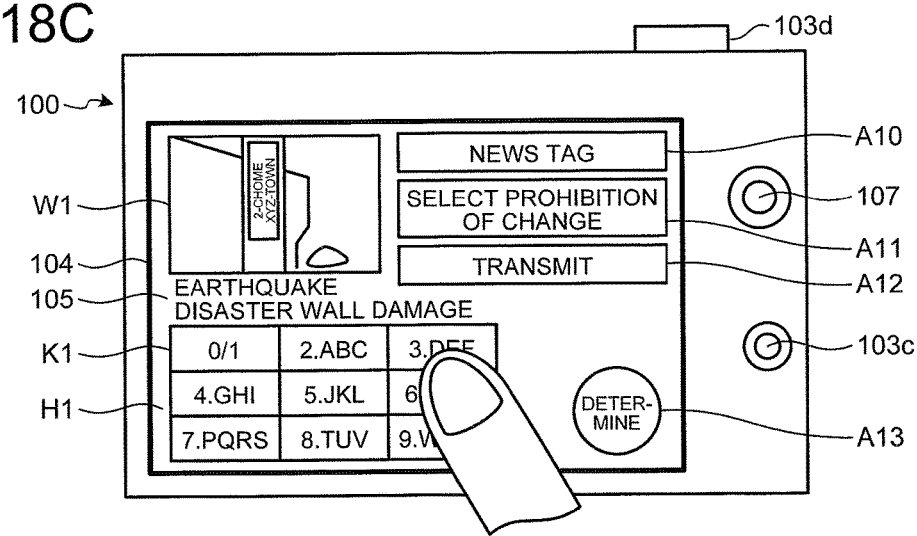
FIG. 18C is a diagram illustrating an example of the key board displayed by the display unit of the imaging apparatus according to the first embodiment.

Thereafter, the meta information generating unit 110d generates a news tag according to input on the keyboard K1 via the touch panel 105 (step S310). For example, the meta information generating unit 110d generates, as meta information of the title of the news feed, the input on the key board K1 via the touch panel 105 by the shooter, which is "earthquake disaster wall damage" (FIG. 18B→FIG. 18C). When this is done, the display control unit 110i causes the display unit 104 to display a determine icon A13 for receiving input of an instruction signal instructing determination of the title. In FIG. 18A to FIG. 18C, the display control unit 110i may cause a conversion icon for converting a letter or number selected via the key board K1 to be displayed in the keyboard K1 or tag selection input screen H1.

Subsequently, if the determine icon A13 is selected by the shooter via the touch panel 105 (step S311: Yes), the meta information adding unit 110e additionally records the meta information of the news feed generated by the meta information generating unit 110d in comment information in a header information storage area of the image file (step S312). After step S312, the imaging apparatus 100 returns to step S307. In contrast, if the determine icon A13 is not selected by the shooter via the touch panel 105 (step S311: No), the imaging apparatus 100 returns to step S309.

Figure 19A:
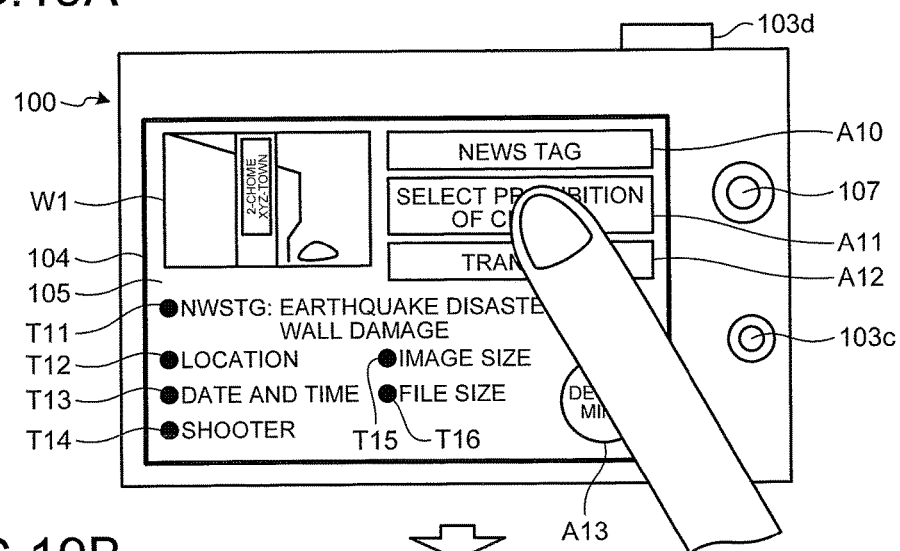
FIG. 19A is a diagram illustrating an example of meta information displayed by the display unit of the imaging apparatus according to the first embodiment.
Figure 19B:
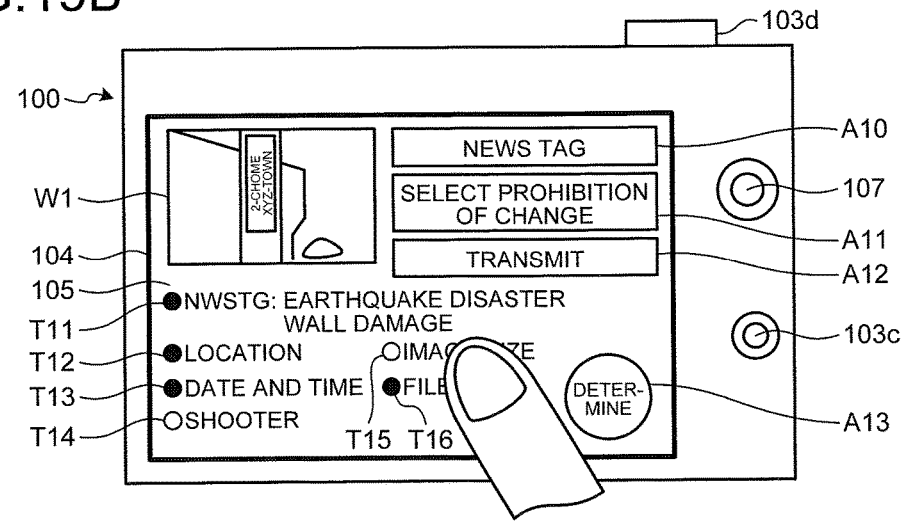
FIG. 19B is a diagram illustrating an example of the meta information displayed by the display unit of the imaging apparatus according to the first embodiment.

At step S308, if the news tag icon A10 is not selected (step S308: No) and the select-prohibition-of-change icon A11 is selected (step S313: Yes), the display control unit 110i causes the display unit 104 to display a list of meta information (step S314). Specifically, as illustrated in FIG. 19A and FIG. 19B, the display control unit 110i causes the display unit 104 to display the list of meta information. For example, as illustrated in FIG. 19A, the display control unit 110i causes the display unit 104 to display, as meta information, at least a title T11 of the news tag (NWSTG), a shooting location T12, a shooting time T13, a shooter T14, an image size T15 (volume information), and a file size T16. The meta information to be displayed may be set as appropriate. If a large degree of freedom is given to this file size, treatment thereof, such as transmission and reception or processing thereof, becomes difficult, and thus a certain limitation thereon is preferable. Therefore when additional recording of information is characteristic as in the present invention, means for making this file size to be within a certain range become important. For example, if an amount of information is increased, an image data portion may be resized, or information that is deletable may be deleted. Information on whether the information is deletable is recorded in the image file as the possibility information F29. For example, an image requires about one mega byte if printing is postulated, but for viewing with a compact portable device, about ten kilo bytes are sufficient. However, for an image to be viewed with its fine parts being enlarged, reduction (resizing) to that extent is not preferable and there is limitation on resizing according to its use, and thus such information may be recorded in the possibility information F29 of the image file. Therefore, such possibility of resizing or information on limitation may be made to be able to be input by a user, or information that becomes a guide of image quality such as high vision or VGA may be made to be able to be input. Of course, the imaging apparatus 100 may perform control to make such setting by a predetermined program.

Subsequently, the possibility information generating unit 110g generates a prohibition flag prohibiting change or additional recording of meta information by the portable device 300 according to input on a plurality of pieces of meta information via the touch panel 105 and additionally records the prohibition flag in possibility information in a header information storage area of the image file (step S315). For example, the possibility information generating unit 110g generates a prohibition flag prohibiting change in the image size T15, if the image size T15 is touched, and additionally records the prohibition flag in the possibility information F29 of the image file (FIG. 19A→FIG. 19B). In this case, the display control unit 110i causes the display unit 104 to display each meta information for which the prohibition flag has been generated by the possibility information generating unit 110g in a blackened form. Thereby, when the volume of the image file is over the prescribed amount, the resize process in which the image data are automatically compressed or reduced is preventable. In FIG. 19A and FIG. 19B, the possibility information generating unit 110g has been described with an example in which the image size T15 is the meta information, but a prohibition flag prohibiting change of the shooting location T12, the shooting time T13, and the shooter T14 may be generated and additionally recorded in the possibility information F29 of the image file. Further, private information of the shooter, for example, the shooting location T12, the shooting time T13, and the shooter T14 is preventable from being modified by another user.

Thereafter, if the determine icon A3 is selected by the shooter via the touch panel 105 (step S316: Yes), the imaging apparatus 100 returns to step S307. In contrast, if the determine icon A13 is not selected by the shooter via the touch panel 105 (step S316: No), the imaging apparatus 100 returns to step S314.

At step S308, if the news tag icon A10 is not selected (step S308: No) and the select-prohibition-of-change icon A11 is not selected (step S313: No), the imaging apparatus 100 proceeds to step S317.

Subsequently, if the transmit icon A12 is selected (step S317: Yes), the image file is transmitted to the SNS server 200 (step S318). After step S318, the imaging apparatus 100 returns to step S305.

At step S317, if the transmit icon A12 is not selected (step S318: No), the imaging apparatus 100 proceeds to step S319.

Subsequently, if the share switch 103c is operated (step S319: Yes), the imaging apparatus 100 returns to step S305. In contrast, if the share switch 103c is not operated (step S319: No), the imaging apparatus 100 returns to step S307.

Next, a process executed by the SNS server 200 will be described. FIG. 20 is a flow chart illustrating an outline of the process executed by the SNS server 200.

As illustrated in FIG. 20, first, a case in which data are received from the imaging apparatus 100 (step S401: Yes) will be described. In this case, the SNS server control unit 203 receives an image file transmitted from the imaging apparatus 100 via the communication unit 201 (step S402).

Subsequently, the SNS server control unit 203 stores the image file in a specified page of the image database 202 (step S403).

Thereafter, the meta information adding unit 203b tags an address on the network and additionally records the tagged address in comment information of the image file (step S404). After step S404, the SNS server 200 returns to step S401.

At step S401, if data are not received from the imaging apparatus 100 (step S401: No) and there is an access to a browser from the portable device 300 (step S405: Yes), the display control unit 203e causes the portable device 300 to display a specified page and meta information corresponding to the access from the portable device 300 (step S406).

Subsequently, if there is a switch over instruction from the portable device 300 to switch over to another page (step S407: Yes), the display control unit 203e causes the portable device 300 to display the another page and meta information corresponding to a switch over signal from the portable device 300 (step S408).

Thereafter, if an end instruction to end browsing of the specified page is input from the portable device 300 (step S409: Yes), the SNS server 200 returns to step S401. In contrast, if the end instruction to end browsing of the specified page is not input from the portable device 300 (step S409: No), the SNS server 200 proceeds to step S410.

At step S410, if there is an instruction to select an image from the portable device 300 (step S410: Yes), the SNS server 200 proceeds to later described step S411. In contrast, if there is no instruction to select an image from the portable device 300 (step S410: No), the SNS server 200 returns to step S407.

At step S407, if there is no change over instruction to switch over to another page from the portable device 300 (step S407: No), the SNS server 200 proceeds to step S409.

At step S411, if comment data to be additionally recorded with the image are received from the portable device 300 via the network "N" (step S411: Yes), the SNS server 200 proceeds to later described step S412. In contrast, if the comment data to be additionally recorded with the image from the portable device 300 is not received via the network "N" (step S411: No), the SNS server 200 proceeds to later described step S417.

At step S412, the data size determination unit 203c determines whether or not a data volume of the image file exceeds a prescribed amount when the comment data received from the portable device 300 are additionally recorded in the image file. If the data size determination unit 203c determines that the volume of the image file exceeds the prescribed amount when the comment data received from the portable device 300 are additionally recorded in the image file (step S412: Yes) and compression (resizing) of image data of the image file is possible (step S413: Yes), the resizing unit 203d compresses the image data of the image file (step S414). This compression is supposed to be decimation or compressibility increase and it has been already described that limitation may be placed on this resizing.

Subsequently, the meta information adding unit 203b tags the comment data and stores the tagged comment data in the image file (step S415). After step S415, the SNS server 200 returns to step S401.

At step S412, if the data size determination unit 203c determines that the volume of the image file exceeds the prescribed amount when the comment data received from the portable device 300 are additionally recorded in the image file (step S412: Yes) and compression of the image data is not possible, for example, the prohibition flag prohibiting change in data size of the image data is set in the meta information of the image file or a data size of the image data is less than a predetermined value (step S413: No), the display control unit 203e transmits to the portable device 300 a warning that the comment cannot be additionally recorded in a news tag of the selected image (step S416). After step S416, the SNS server 200 returns to step S401.

At step S412, if the data size determination unit 203c determines that the volume of the image file does not exceed the prescribed amount when the comment data received from the portable device 300 are additionally recorded in the image file (step S412: No), the SNS server 200 proceeds to step S415.

At step S411, if the comment data to be additionally recorded with the image are not received from the portable device 300 (step S411: No), the SNS server 200 proceeds to step S417.

Subsequently, if the image file is to be transmitted to the portable device 300 (step S417: Yes), the communication control unit 203f causes the communication unit 201 to transmit the specified image file to the specified address (step S418). After step S418, the SNS server 200 returns to step S401.

At step S417, if the image file is not to be transmitted to the portable device 300 (step S417: No), the SNS server 200 returns to step S401.

At step S401, if data are not received from the imaging apparatus 100 (step S401: No) and there is no access from the portable device 300 to the browser (step S405: No), the SNS server 200 returns to step S401.

According to the above described first embodiment of the present invention, because the image file generating unit 110h of the imaging apparatus 100 generates the image file associating the image data generated by the imaging unit 101, the plurality of pieces of meta information related to the image data generated by the meta information generating unit 110d, and the possibility information generated by the possibility information generating unit 110g with one another, while being able to additionally record information, treatment thereof is easily and simply possible, and an image file is able to be transmitted without delay according to a communication standard with a prescribed communication speed.

Further, according to the first embodiment of the present invention, the possibility information generating unit 110g of the imaging apparatus 100 generates the prohibition flag prohibiting the additional recording of the new information or the change in the original information by the portable device 300 for the meta information selected from the plurality of pieces of meta information displayed by the display unit 104, based on the selection signal input from the input unit 103 or touch panel 105, and additionally records the prohibition flag in the possibility information of the image file. Thereby, the shooter is able to prevent modification of desired meta information of an image file when transmitting the image file to the SNS server 200 to share the image file with another user.

Further, according to the first embodiment of the present invention, when the data size determination unit 203c of the SNS server 200 determines that the volume of the image file exceeds the prescribed amount when the meta information adding unit 302b additionally records the additional data received from the portable device 300, the resizing unit 203d of the SNS server 200 resizes the image data in the image file and thus the image file is able to be transmitted without delay according to a communication standard with a prescribed communication speed.

Second Embodiment

Next, a second embodiment will be described. An imaging apparatus according to the second embodiment has a configuration that is the same as that of the imaging apparatus according to the above described first embodiment, and only a shooting mode process thereof is different. Further, an SNS server according to the second embodiment has a configuration that is the same as that of the SNS server according to the above described first embodiment, and only a process executed thereby is different. Accordingly, hereinafter, after describing the shooting mode process executed by the imaging apparatus, the process executed by the SNS server will be described. Configurations that are the same as those of the imaging apparatus 100 and the SNS server 200 according to the above described first embodiment will be appended with the same symbols and description thereof will be omitted.

Figure 21:
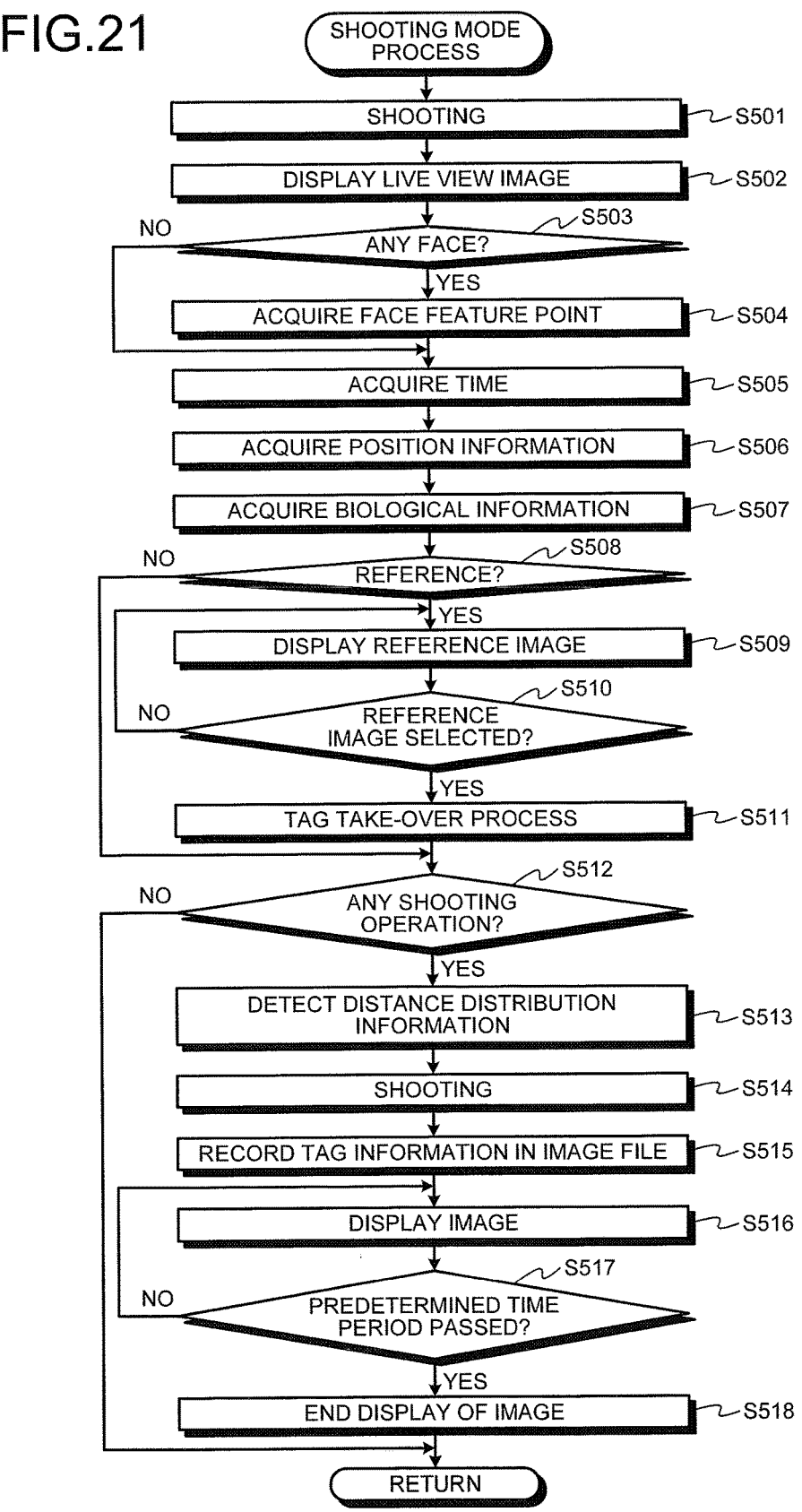
FIG. 21 is a flow chart illustrating an outline of a shooting mode process executed by an imaging apparatus according to a second embodiment.

First, the shooting mode process executed by the imaging apparatus 100 will be described. FIG. 21 is a flow chart illustrating an outline of the shooting mode process executed by the imaging apparatus 100.

Figure 22:
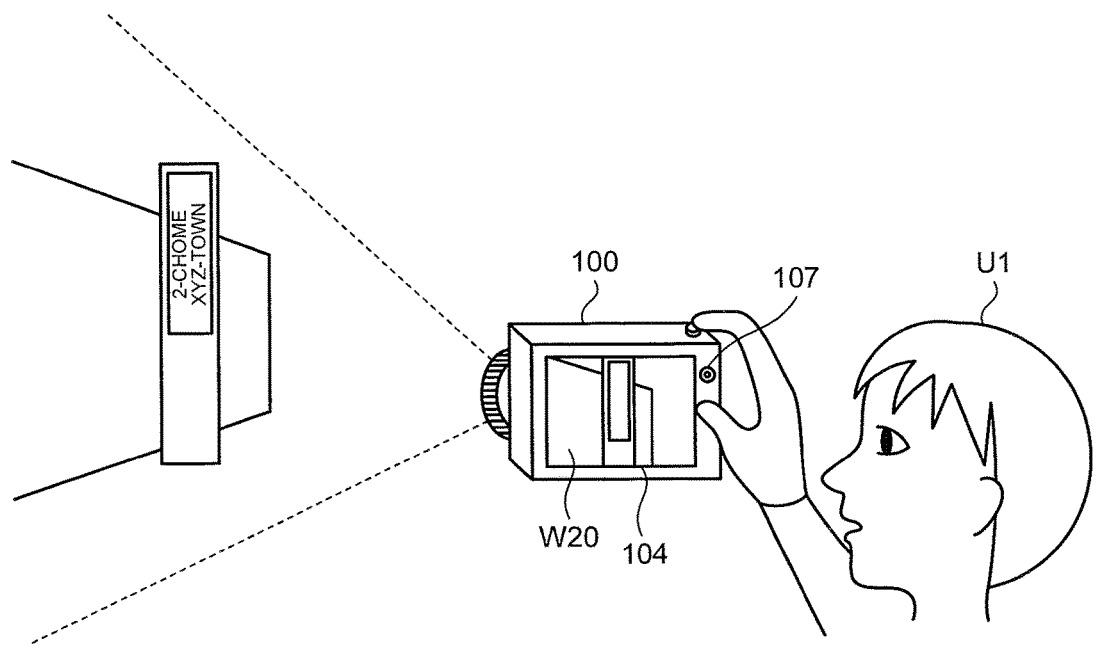
FIG. 22 is a diagram schematically illustrating a situation in which shooting is performed by using the imaging apparatus according to the second embodiment.

As illustrated in FIG. 21, the imaging control unit 110f causes the imaging unit 101 to execute shooting (step S501). Subsequently, the display control unit 110i causes the display unit 104 to display a live view image corresponding to image data generated by the imaging unit 101 (step S502). In this case, as illustrated in FIG. 22, a shooter U1 performs shooting while adjusting, by checking a live view image W20 displayed by the display unit 104 of the imaging apparatus 100, any of a composition and shooting conditions with respect to a subject.

Step S503 to step S507 correspond respectively to steps S203 to step S207 of FIG. 11.

Figure 23:
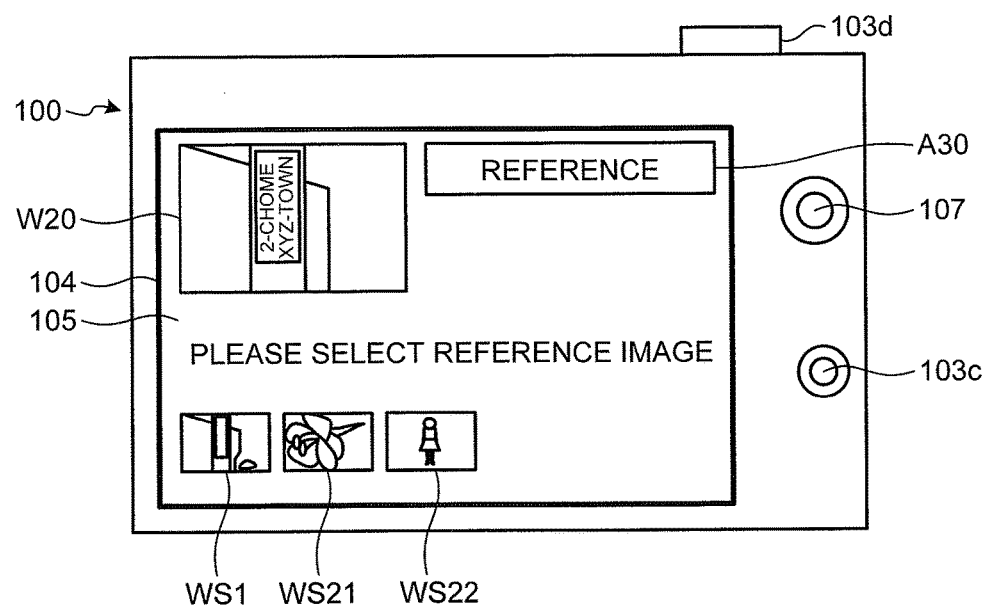
FIG. 23 is a diagram illustrating an example of an image displayed by a display unit of the imaging apparatus according to the second embodiment.

At step S508, if the share switch 103c is operated and an instruction signal to refer to an image file posted to the SNS server 200 in the past is input (step S508: Yes), the display control unit 110i causes the display unit 104 to display a reference image (step S509). Specifically, as illustrated in FIG. 23, the display control unit 110i causes the display unit 104 to display a thumbnail image of each image file recorded in the image data recording unit 108b and transmitted to the SNS server 200, for example, a thumbnail image WS1, a thumbnail image WS21, and a thumbnail image WS22, as reference images (related images). In this case, the display control unit 110i reduces the display area of the live view image W20 to be displayed by the display unit 104. Further, the display control unit 110i causes the display unit 104 to display a reference icon A30 indicating that transition to reference shooting has taken place.

Figure 24:
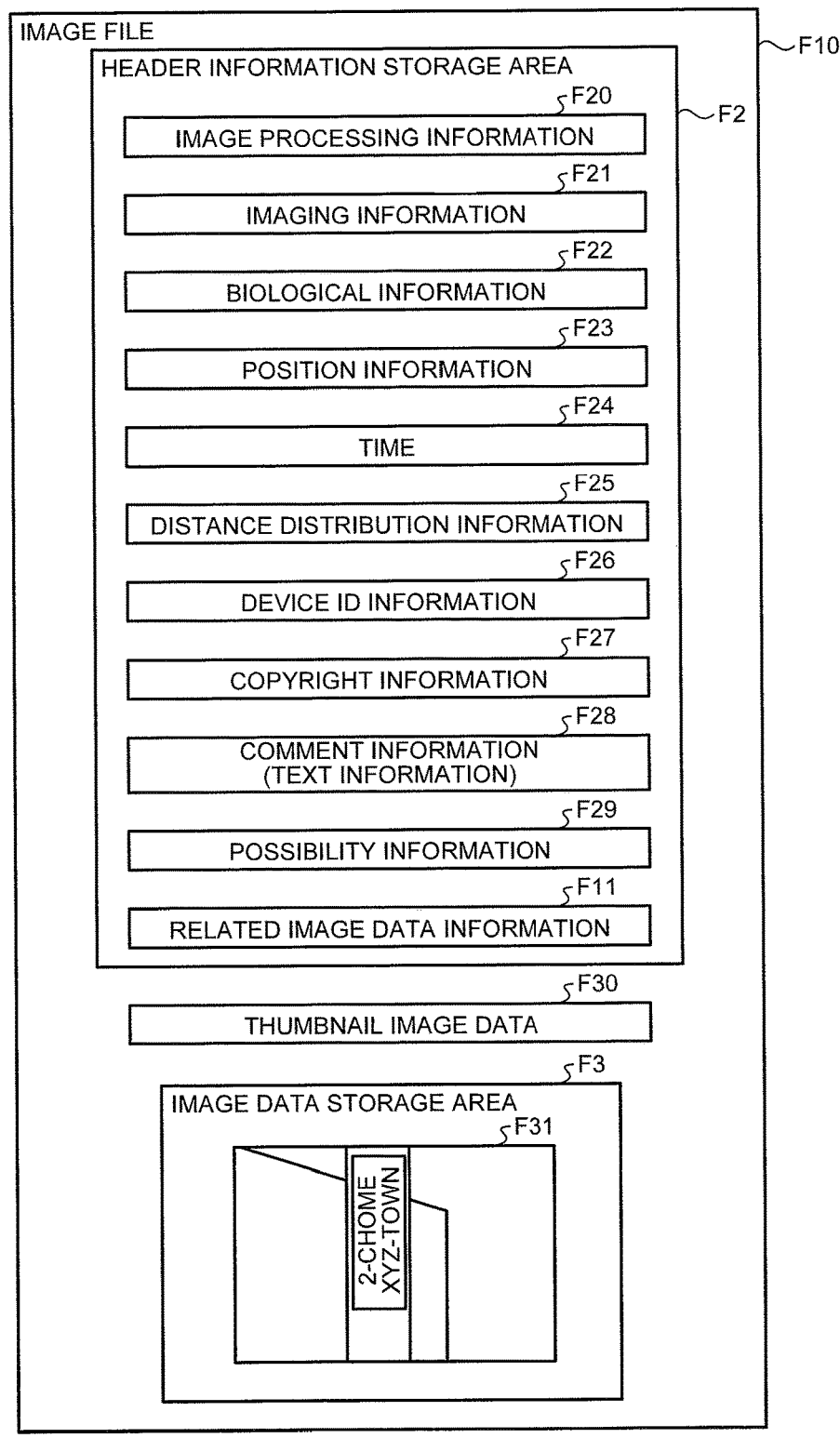
FIG. 24 is a diagram schematically illustrating an example of a structure of an image file recorded in a recording unit of the imaging apparatus according to the second embodiment.

Subsequently, if a reference image is selected via the touch panel 105 from a plurality of reference images displayed by the display unit 104 (step S510: Yes), the meta information adding unit 110e executes a tag take-over process (step S511). Specifically, as illustrated in FIG. 24, the meta information adding unit 110e executes a tag take-over process of recording, into a header information storage area F2 of an image file F10 recording image data planned to be shot, related image data information F11 related to the image data. The related image data information F11 records therein related image data associated with the image data, and meta information of the related image, for example, an address of the SNS server 200, a specified page, a title on a news feed, comment data additionally recorded from another account, and the like.

At step S508, if the share switch 103c is not operated and the instruction signal for referring to the image file posted to the SNS server 200 in the past is not input (step S508: No), the imaging apparatus 100 proceeds to later described step S512.

At step S510, if a reference image is not selected via the touch panel 105 from the plurality of reference images displayed by the display unit 104 (step S510: No), the imaging apparatus 100 returns to step S509.

Step S512 to step S518 correspond respectively to step S208 to step S214 of FIG. 11. After step S518, the imaging apparatus 100 returns to the main routine of FIG. 10.

Figure 25:
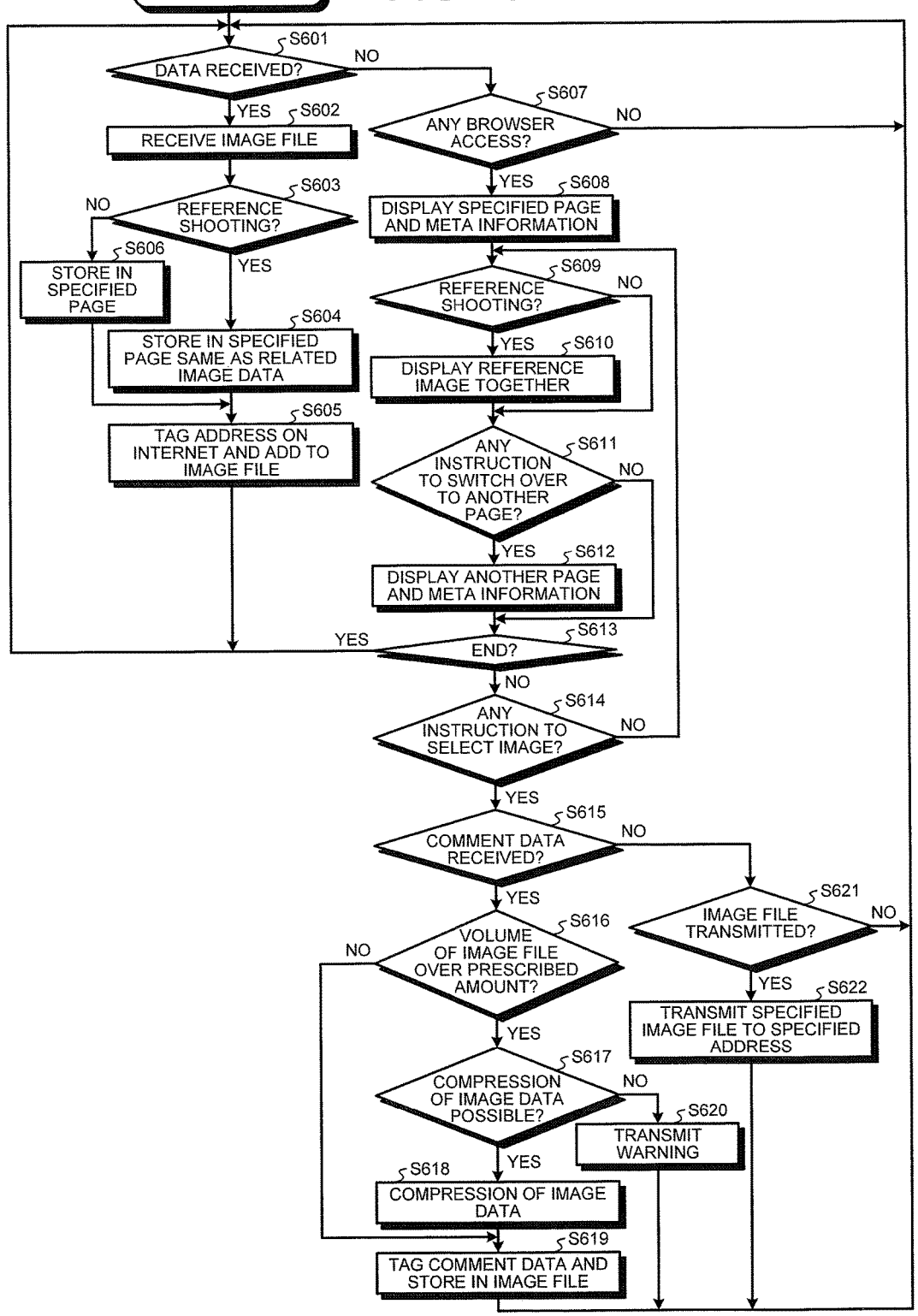
FIG. 25 is a flow chart illustrating an outline of a process executed by an SNS server according to the second embodiment.

Next, the process executed by the SNS server 200 will be described. FIG. 25 is a flow chart illustrating an outline of the process executed by the SNS server 200.

In FIG. 25, step S601 and step S602 correspond respectively to step S401 and step S402 of FIG. 20.

At step S603, if an image file received is of reference shooting (step S603: Yes), the image file is stored in a specified page of the image database 202 that is the same as that of the related image data (step S604). After step S604, the SNS server 200 proceeds to step S605.

At step S603, if the image file received is not of reference shooting (step S603: No), the SNS server 200 proceeds to step S606.

Step S605 corresponds to step S404 of FIG. 20. Further, step S606 corresponds to step S403 of FIG. 20. Step S607 and step S608 correspond respectively to step S405 and step S406 of FIG. 20.

Figure 26:
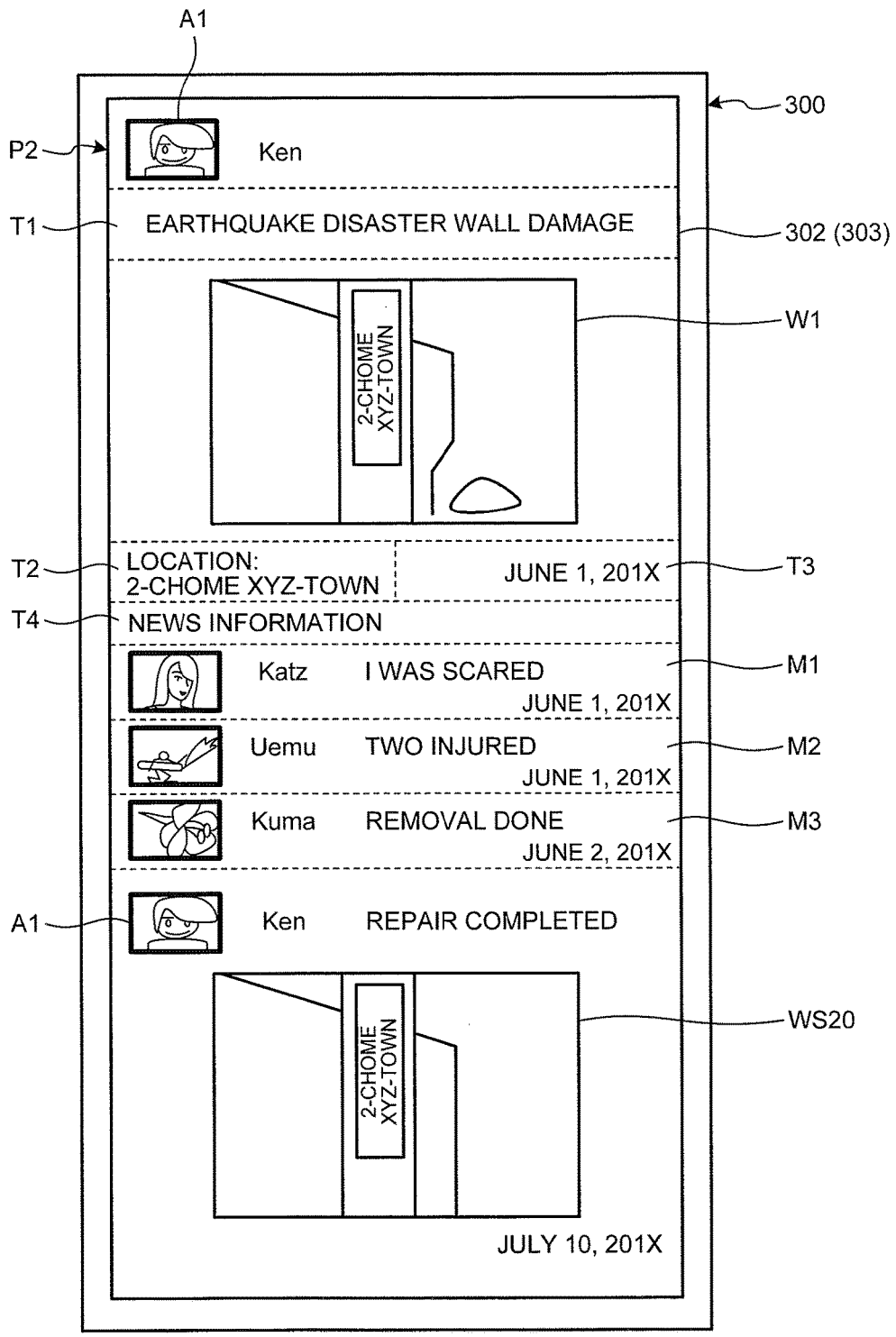
FIG. 26 is a diagram illustrating an example of a specified page displayed by a display unit of a portable device according to the second embodiment.

At step S609, if a specified page according to an access from the portable device 300 is of reference shooting (step S609: Yes), the display control unit 203e causes the display unit 302 of the portable device 300 to display the specified page according to the access from the portable device 300, meta information, and reference images together (step S610). Specifically, as illustrated in FIG. 26, the display control unit 203e causes the display unit 302 of the portable device 300 to display a specified page P2, a title T1 of the past meta information, a shooting location T2, a shooting time T3, news information T4, comments M1 to M3 written onto the specified page P2, a related image WS20, and meta information of the related image WS20 together. Thereby, a user of the portable device 300 is able to grasp intuitively a related image from a news feed where latest information is sequentially displayed in time series. Further, the user of the portable device 300 is able to shorten a retrieval time period for retrieving an image related to the related image WS20 from a vast group of images on the news feed. After step S610, the SNS server 200 proceeds to step S611.

At step S609, if the specified page according to the access from the portable device 300 is not of reference shooting (step S609: No), the SNS server 200 proceeds to step S611.

Step S611 to step S622 correspond respectively to step S407 to step S418 of FIG. 20.

According to the above described second embodiment, the meta information adding unit 110e of the imaging apparatus 100 additionally records, as the meta information, in the image file, any of the related image data associated with the image data, the address information on the network of the related image data associated with the image data, and the advertisement information associated with the image data. Thereby, a user of the portable device 300 is able to grasp intuitively a related image from a news feed where latest information is sequentially displayed in time series.

Figure 27:
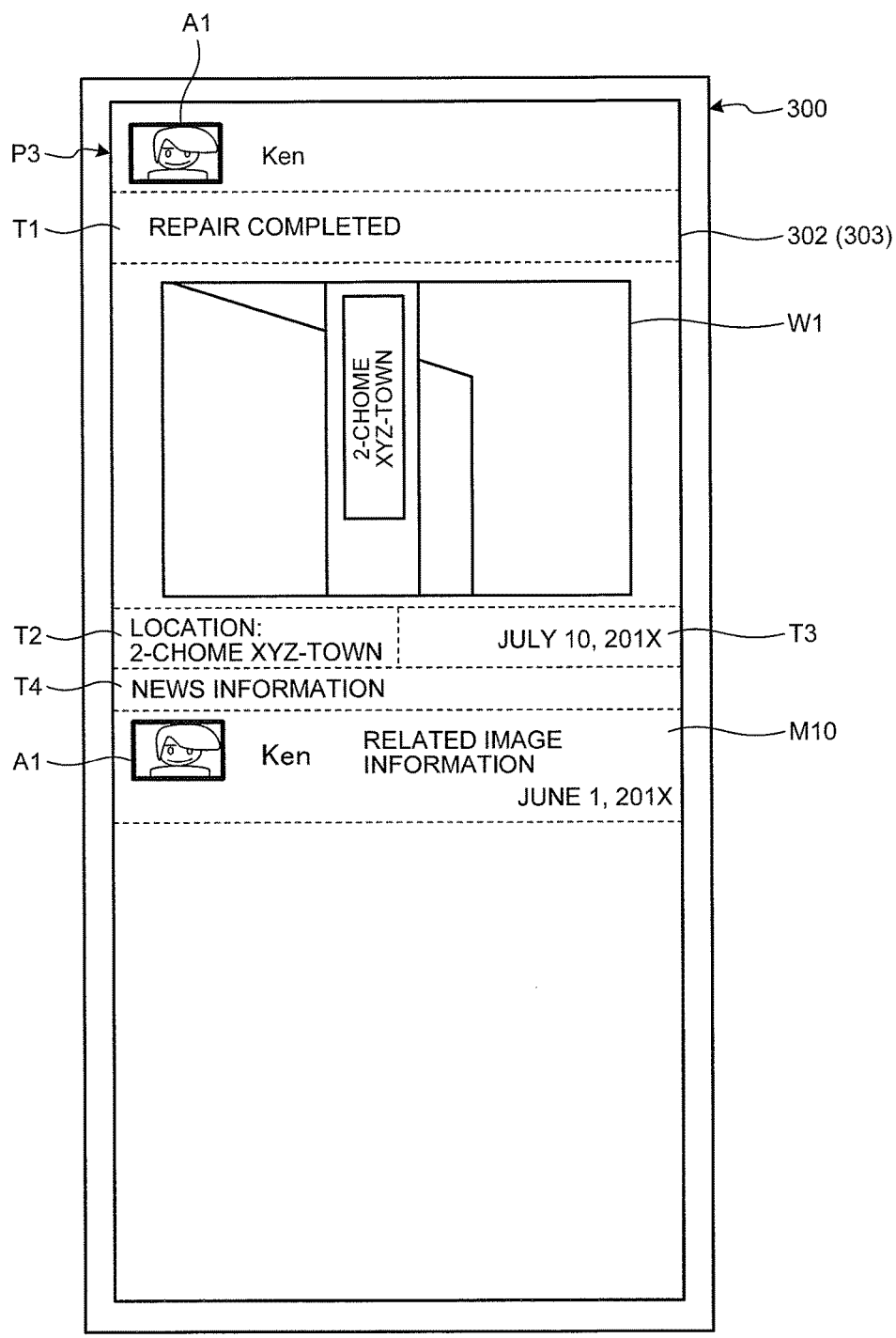
FIG. 27 is a diagram illustrating another example of the specified page displayed by the display unit of the portable device according to the second embodiment.

In the second embodiment, the display control unit 203e associates the latest image on the specified page P2 and causes the display unit 302 of the portable device 300 to perform the display thereof, but the reference image may be associated on another specified page and the display unit 302 of the portable device 300 may be caused to perform display thereof. For example, as illustrated in FIG. 27, the display control unit 203e may cause the display unit 302 of the portable device 300 to display the referenced related image information on a specified page P3 as a comment M10 of the news information T4. Thereby, a user of the portable device 300 is able to intuitively grasp information on a reference image displayed on a news feed in the past just by browsing the latest information on the news feed. Further, if the related image information on the comment M10 is selected, the display control unit 203e causes the display unit 302 of the portable device 300 to display a specified page associated with the related image information. Thereby, the related image displayed on the newsfeed in the past is able to be visually checked by a simple and easy operation.

Third Embodiment

Next, a third embodiment will be described. In an imaging apparatus according to the third embodiment, a configuration of the control unit of the imaging apparatus according to the above described first embodiment is different, and a shooting mode process executed by the imaging apparatus is different. Therefore, hereinafter, after describing the configuration of the control unit of the imaging apparatus, the shooting mode process executed by the imaging apparatus will be described. Structural elements that are the same as those of the imaging apparatus 100 according to the above described first embodiment will be appended with the same symbols and description thereof will be omitted.

Figure 28:
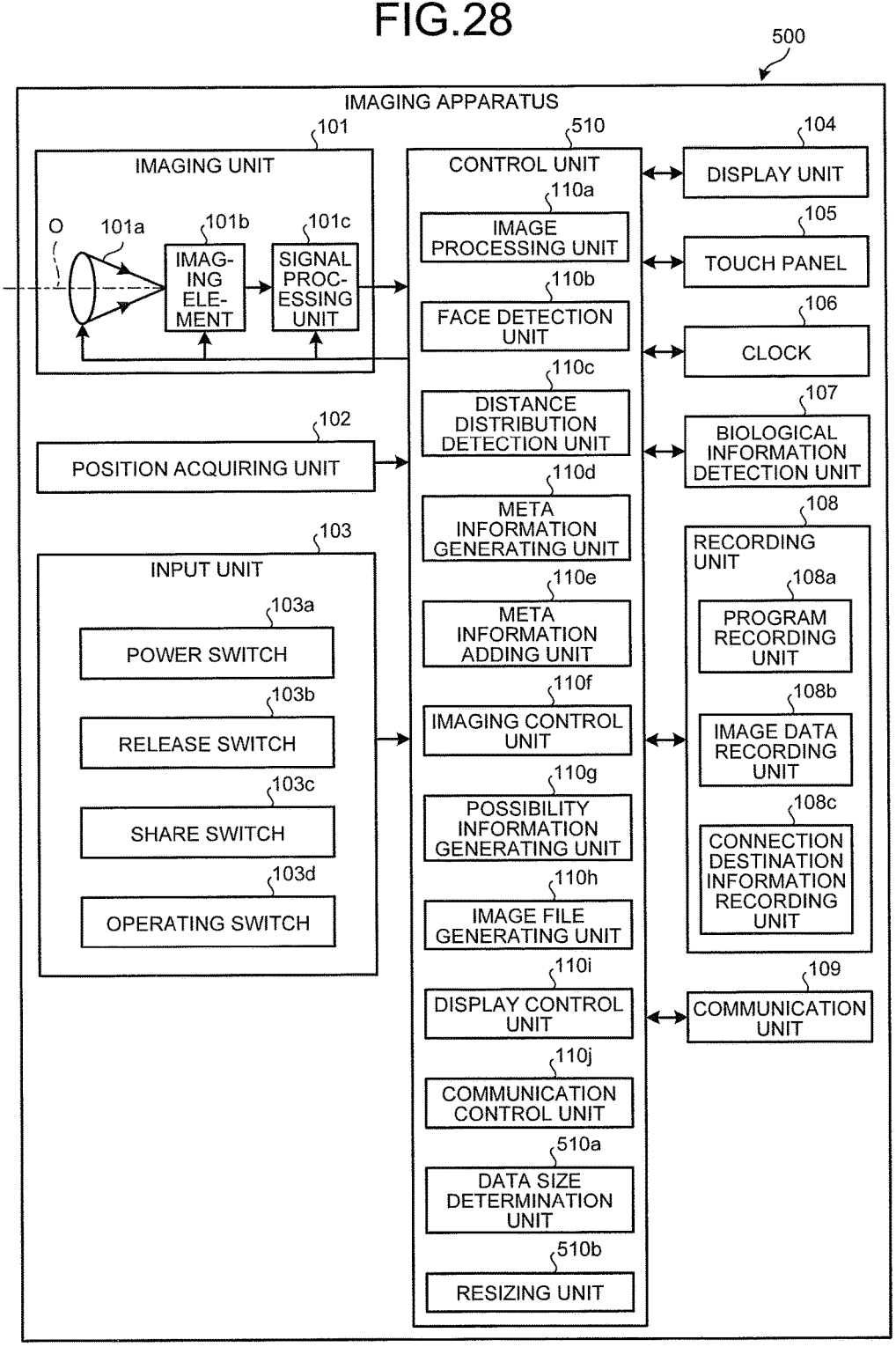
FIG. 28 is a block diagram illustrating a functional configuration of an imaging apparatus according to a third embodiment.

FIG. 28 is a block diagram illustrating a functional configuration of the imaging apparatus according to the third embodiment. An imaging apparatus 500 illustrated in FIG. 28 includes a control unit 510 instead of the control unit 110 of the imaging apparatus 100 according to the above described first embodiment.

The control unit 510 comprehensively controls operations of the imaging apparatus 500 by performing transfer or the like of instructions and data corresponding to respective units forming the imaging apparatus 500 according to the instruction signal input from the input unit 103, the position signal input from the touch panel 105, or the like. The control unit 510 is configured by using a CPU or the like.

A detailed configuration of the control unit 510 will now be described. The control unit 510 has: the image processing unit 110a; the face detection unit 110b; the distance distribution detection unit 110c; the meta information generating unit 110d; the meta information adding unit 110e; the imaging control unit 110f; the possibility information generating unit 110g; the image file generating unit 110h; the display control unit 110i; the communication control unit 110j; a data size determination unit 510a; and a resizing unit 510b.

The data size determination unit 510a determines, if the meta information adding unit 110e is to additionally record meta information or image data to an image file, whether or not a volume of the image file planned to be additionally recorded with the meta information by the meta information adding unit 110e will exceed a prescribed amount.

The resizing unit 510b executes, if the data size determination unit 510a determines that the volume of the image data exceeds the prescribed amount, a resizing process of compressing or reducing image data stored in the image file and store them in the image database 202.

Figure 29:
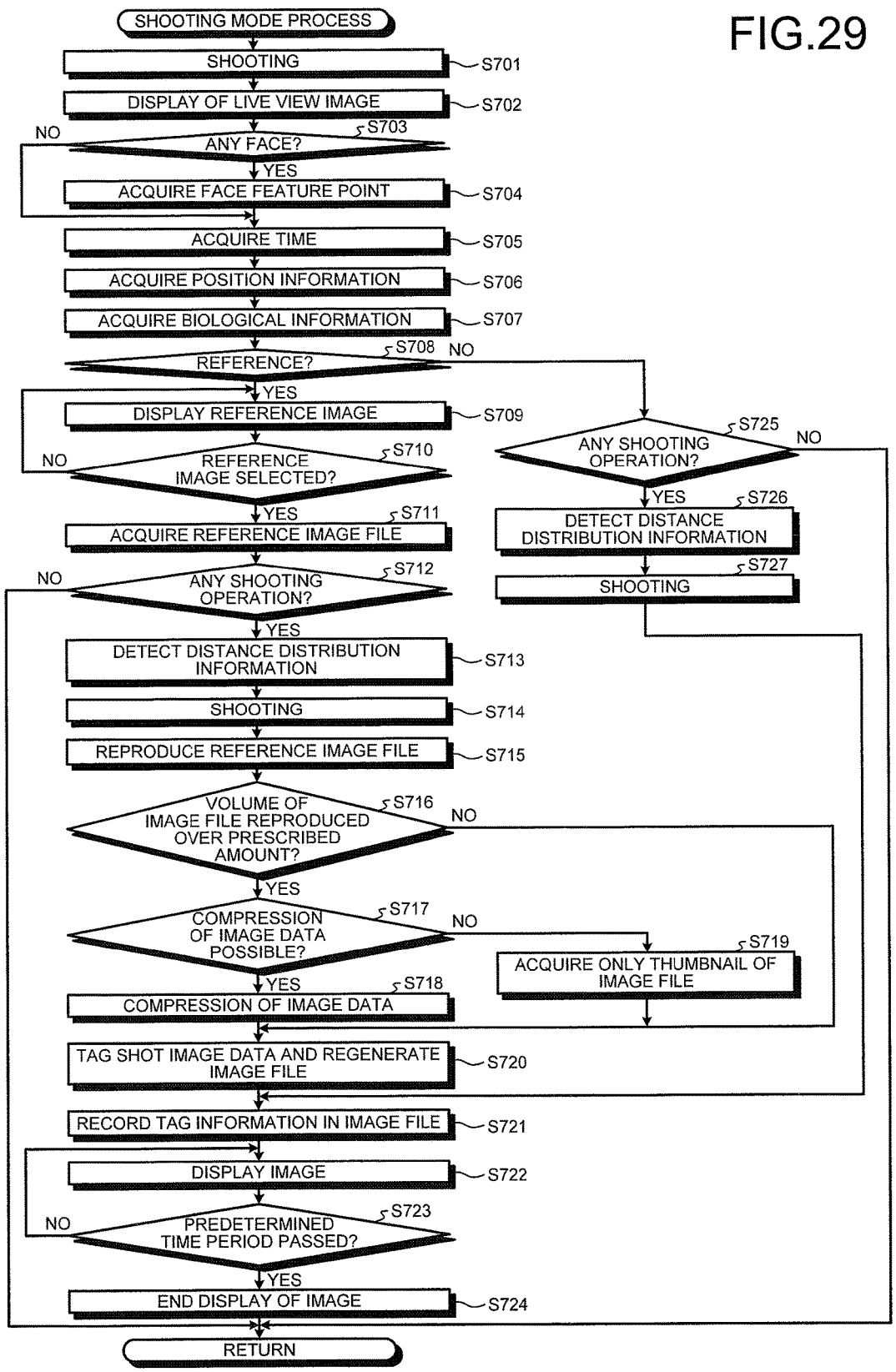
FIG. 29 is a flow chart illustrating an outline of a shooting mode process executed by the imaging apparatus according to the third embodiment.

Next, the shooting mode process executed by the imaging apparatus 500 will be described. FIG. 29 is a flow chart illustrating an outline of the shooting mode process executed by the imaging apparatus 500.

In FIG. 29, step S701 to step S707 correspond respectively to step S201 to step S207 of FIG. 11. Further, step S708 to step S710 correspond respectively to step S508 to step S510 of FIG. 21.

Figure 30:
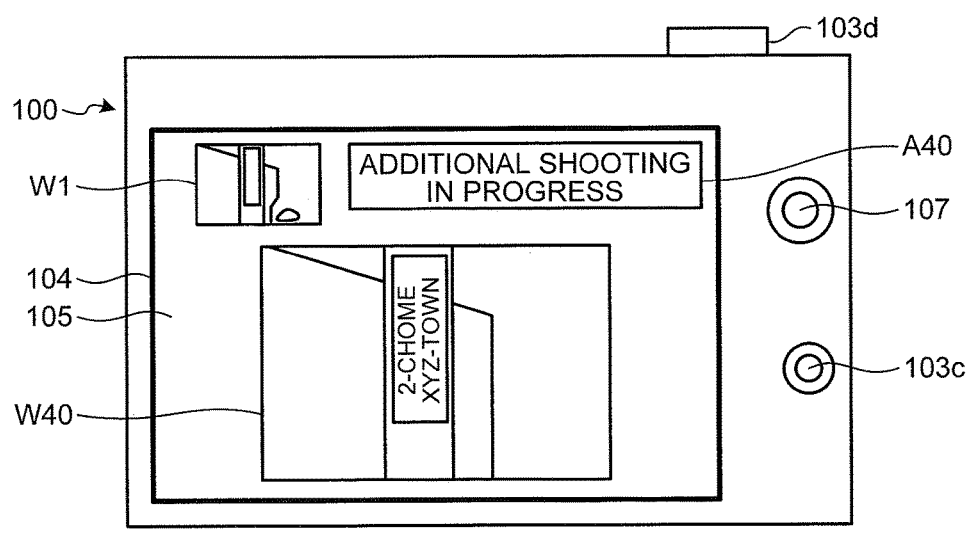
FIG. 30 is a diagram illustrating an example of an image displayed by a display unit while the imaging apparatus according to the third embodiment is performing additional shooting.

At step S711, the display control unit 110i acquires a reference image file from the image data recording unit 108b and causes the display unit 104 to display the reference image file. Specifically, as illustrated in FIG. 30, the display control unit 110i causes the display unit 104 to display a thumbnail image W40 stored in the reference image file and causes a display area of a live view image W1 to be reduced and displayed by the display unit 104. Further, the display control unit 110i causes the display unit 104 to display an additional-shooting-in-process icon A40 indicating that the imaging apparatus 500 is in the process of additional shooting.

Step S712 to step S714 correspond respectively to step S208 to step S210 of FIG. 11.

At step S715, the meta information generating unit 110d reproduces a reference image file corresponding to the thumbnail image W40 being displayed by the display unit 104.

Subsequently, the data size determination unit 510a determines whether or not a volume of the image file reproduced by the meta information generating unit 110d exceeds a prescribed amount (step S716). If the data size determination unit 510a determines that the volume of the image file reproduced by the meta information generating unit 110d has exceeded the prescribed amount (step S716: Yes), the imaging apparatus 500 proceeds to later described step S717. In contrast, if the data size determination unit 510a determines that the volume of the image file reproduced by the meta information generating unit 110d has not exceeded the prescribed amount (step S716: No), the imaging apparatus 500 proceeds to later described step S720.

At step S717, if image data of the image file reproduced is compressible (step S717: Yes), the resizing unit 510b performs compression (a resize process) of a data size of the image data of the reproduced image file (step S718). After step S718, the imaging apparatus 500 proceeds to later described step S720.

At step S717, if the image data of the reproduced image file is not compressible (step S717: No), the meta information generating unit 110d acquires thumbnail image data stored in the reproduced image file (step S719).

Subsequently, the meta information generating unit 110d tags the shot image data and regenerates an image file (step S720).

Figure 31:
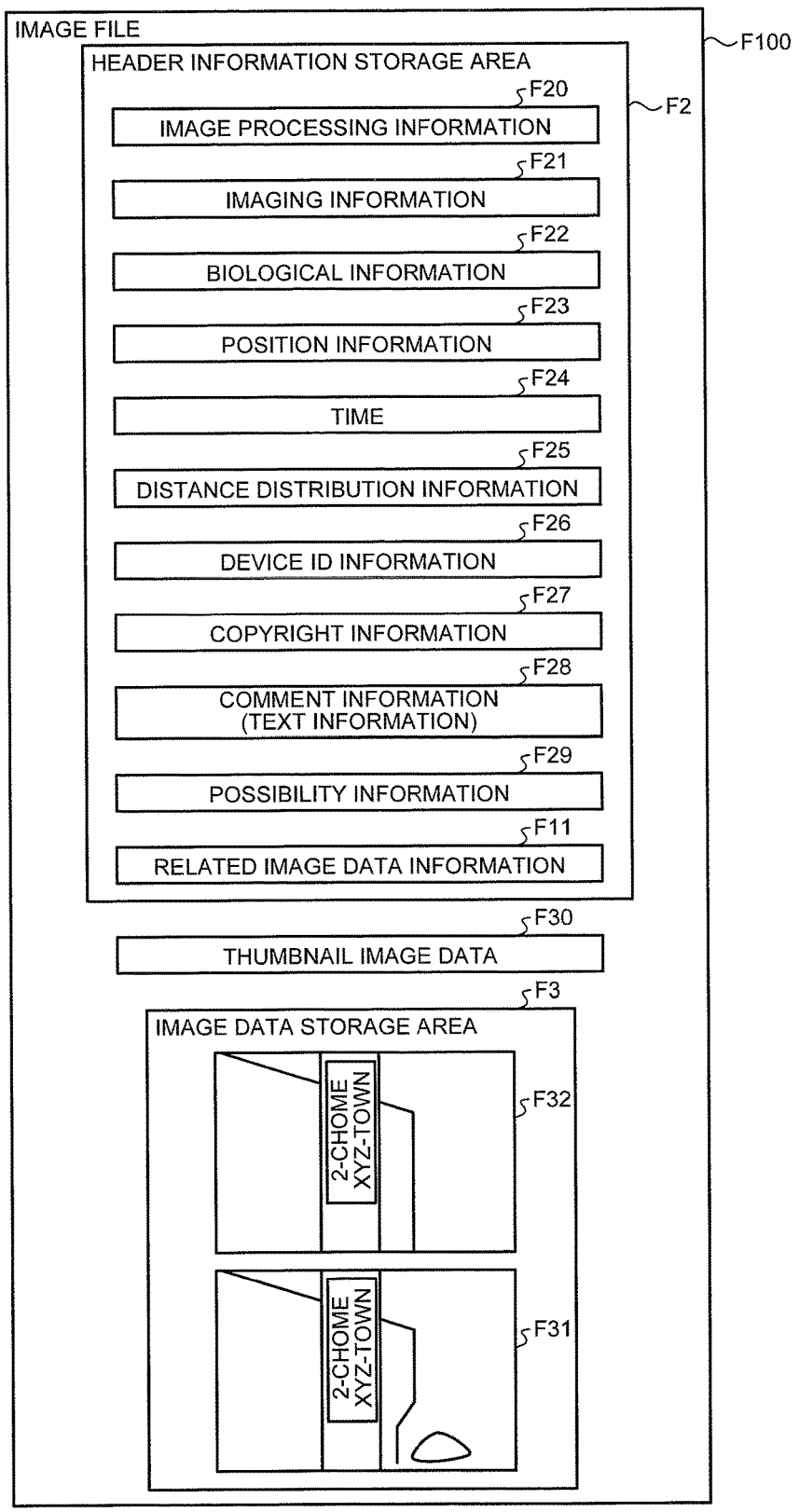
FIG. 31 is a diagram schematically illustrating an example of a structure of an image file recorded in a recording unit of the imaging apparatus according to the third embodiment.

Thereafter, the image file generating unit 110h generates an image file associating the image data generated by the imaging unit 101 with the meta information including the image data of the reproduced image file generated by the meta information generating unit 110d or the thumbnail image data and records the image file in the image data recording unit 108b (step S721). Specifically, as illustrated in FIG. 31, the image file generating unit 110h generates an image file F100 associating an image data F32 generated by the imaging unit 101 with meta information including image data F31 of the reproduced image file generated by the meta information generating unit 110d and stores the image file F100 in the image data recording unit 108b.

Figure 32:
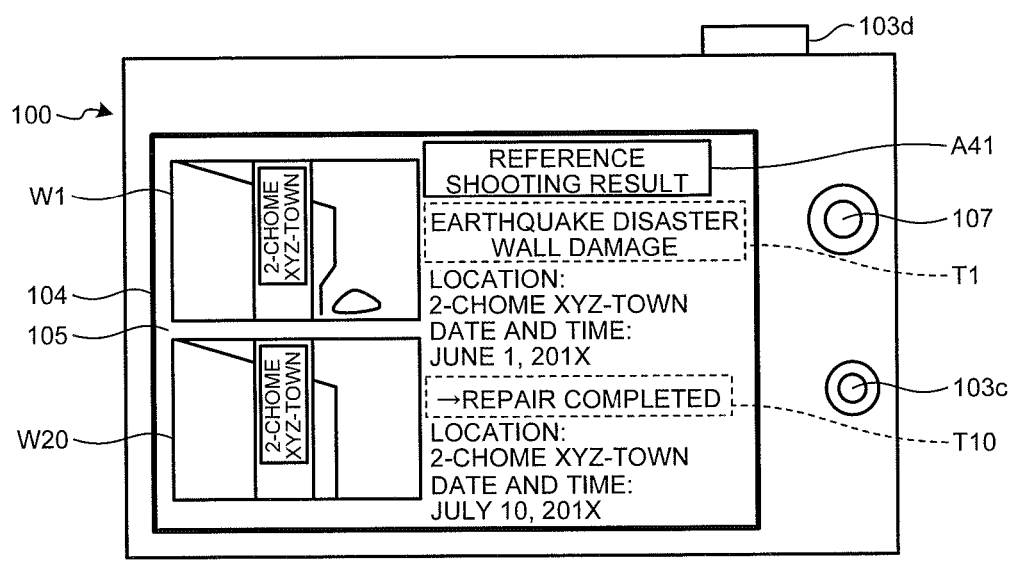
FIG. 32 is a diagram illustrating an example of a confirmation image of a reference shooting result displayed by the display unit of the imaging apparatus according to the third embodiment.

Subsequently, the display control unit 110i causes the display unit 104 to display an image corresponding to the image data stored in the image file (step S722). Specifically, as illustrated in FIG. 32, the display control unit 110i causes the display unit 104 to display the image W1 corresponding to the image data generated by the imaging unit 101 and a related image W20 that has been referenced. Further, the display control unit 110i causes the display unit 104 to display some of respective meta information of the image W1 and related image W20, for example, titles T1 and T10, locations, and dates and times. Furthermore, the display control unit 110i causes the display unit 104 to display a reference shooting result icon A41 indicating that it is a shooting result of reference shooting.

Step S723 and step S724 correspond respectively to step S213 and step S214 of FIG. 11. Further, step S725 to step S727 correspond respectively to step S208 to step S210 of FIG. 11.

According to the above described third embodiment, when any of the comment data, related image data, network address information of the related image data, and advertisement information associated with the image data, which are input from the input unit 103 or touch panel 105, are additionally recorded by the meta information adding unit 110e and the data size determination unit 510a of the imaging apparatus 500 determines that the volume of the image file exceeds the prescribed amount, the resizing unit 510b of the imaging apparatus 500 compresses (resizes) the image data in the image file, and thus an image file is able to be transmitted without delay according to a communication standard with a prescribed communication speed. Therefore, treatment of an image file is able to be made easy. For example, effects are demonstrated that a file size is able to be limited, recording is easy, treatment such as processing is easy, and transmission of an image file is possible without delay according to a communication standard with a prescribed communication speed.

Further, according to the third embodiment, because the resizing unit 510b of the imaging apparatus 500 performs volume compression by compressing or resizing the image data in the image file, a room to put another image in a file is produced, and for a mode where various images are compared, the present invention demonstrates a large effect.

Further, in the third embodiment, the possibility information generating unit 110g may set a limitation on the resizing by the resizing unit 510b. By such means for preventing aimless enlargement of a file size, reduction in a volume of the recording unit, and limitation to a file size easily handled, which is preferable under communication situations including recording and transmission, become possible. Even if processing and additional recording on an image are performed via many users' hands, a mode in which the file size does not change and an image that is hard to be dependent on a communication environment are able to be achieved.

Other Embodiments

Further, the imaging apparatus according to these embodiments is applicable to, apart from a digital single lens reflex camera, for example, a digital camera attachable with an accessory or the like, a digital video camera, or an electronic device such as a mobile telephone or tablet type mobile device having an imaging function.

Further, the programs to be executed by the imaging apparatus and SNS server according to these embodiments are provided by being recorded, as a file data in an installable format or executable format, on a computer readable recording medium such as a CD-ROM, a flexible disk (FD), a CD-R, a digital versatile disk (DVD), a USB medium, or a flash memory.

Further, the programs to be executed by the imaging apparatus and SNS server according to these embodiments may be configured to be stored on a computer connected to a network such as the Internet and provided by causing them to be downloaded via the network. Further, the programs to be executed by the imaging apparatus and SNS server according to the present invention may be configured to be provided or distributed via a network such as the Internet.

In describing the flow charts in this specification, context of the processes among the steps is disclosed by using expressions such as "first", "thereafter", and "subsequently", but the sequences of the processes necessary for carrying out the present invention are not uniquely defined by these expressions. In other words, the sequences of the processes in the flow charts described in the present specification may be modified as long as there is no contradiction.

Accordingly, the present invention may include various embodiments not described herein, and various design changes or the like within the scope of the technical ideas specified by the scope of the claims may be made.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information device communicatable via a network, the information device comprising:
    an imaging device that images a subject and generates image data of the subject;
    a display that displays the image data of the subject and related images;
    a related image selecting circuit that selects at least one related image from the displayed related images;
    a meta information generating circuit that generates meta information related to the image data generated by the imaging device;
    an image file generating circuit that generates an image file comprising:
        the image data generated by the imaging device,
        the meta information generated by the meta information generating circuit, and
        related image data information comprising at least related image data corresponding to the image data generated by the imaging device and meta information corresponding to the selected related image, and
    wherein the image data, the meta information and the related image data information are associated with one another in the generated image file; and
    a server that is able to receive the generated imaged file via a network file from an external device, the server comprising:
        a transceiver that receives or transmits the image file via the network;
        a recorder that records therein the image file received from the external device;
        a display control circuit that causes, when an instruction signal instructing browsing of the image file is input from another external device different from the external device, the another external device to display the meta information and an image corresponding to image data;
        a meta information adding circuit that, when permitted by the external device, additionally records, when additional data related to the image data are received from the another external device, the additional data into the image file as new meta information;
        a data size determination circuit that determines, when the meta information adding circuit additionally records the new meta information into the image file, whether or not a volume of the image file exceeds a prescribed amount set beforehand; and
        a resizing circuit that compresses the image data, when the data size determination circuit determines that the prescribed amount is exceeded.

2. The information device according to claim 1, wherein the new meta information is one or more of: comment information on the image data; related image data associated with the image data; and information on an address of the related image data on the network.

3. The information device according to claim 1, wherein the meta information comprises a plurality of pieces of meta information that include: additional change information that is additionally recordable with new information or changeable in its original information by the another external device; and possibility information setting whether or not the additional recording of the new information or change in its original information by the another external device is possible.

4. The information device according to claim 3, wherein the additional change information is any of: copyright information of a shooter who imaged the image data; information on a position at which the image data were imaged; device identification information identifying a device that generated the image data; and volume information related to a volume of the image data.

5. The information device according to claim 3, wherein the possibility information includes resize limitation information of the image data, for resizing by the resizing circuit.

6. The information device according to claim 1, further comprising a possibility information generating circuit that generates, with respect to the meta information, possibility information setting whether or not change of original information is possible by an external device when the meta information is transmitted to the external device.

7. The information device according to claim 6, wherein the meta information has a plurality of pieces of meta information, and each of the plurality of pieces of meta information is any of:
    copyright information of a shooter who imaged the image data;
    information on a position at which the image data was imaged;

device identification information identifying a device that generated the image data; and volume information related to a volume of the image data.

8. The information device according to claim 1, wherein the related image data information further comprises possibility information setting whether or not change of original information is possible by an external device when the related image data information is transmitted to the external device.

9. An image file generating method executed by an information device communicatable via a network, the image file generating method including:

imaging a subject and generating image data of the subject;

displaying the image data of the subject and related images;

selecting at least one related image from the displayed related images;

generating meta information related to the image data;

generating the image file comprising:
the image data of the subject,
the meta information, and
related image data information comprising at least related image data corresponding to the image data of the subject and meta information corresponding to the selected related image,
wherein the image data, the meta information, and the related image data information are associated with one another in the generated image file;

a server that is able to receive the image file from an external device via a network;

recording the image file received from the external device;

causing, when an instruction signal instructing browsing of the image file is input from another external device different from the external device, the another external device to display the meta information and an image corresponding to image data;

additionally recording, when permitted by the external device, and when additional data related to the image data are received from the another external device, the additional data into the image file as new meta information;

determining, when the new meta information is additionally recorded into the image file, whether or not a volume of the image file exceeds a prescribed amount set beforehand; and compressing the image data when the prescribed amount is determined to be exceeded.

10. A nontransitory computer readable recording medium with an executable program stored thereon, wherein the program instructs a processor provided in an information device communicatable via a network to execute:

imaging a subject and generating image data of the subject;

displaying the image data of the subject and related images;

selecting at least one related image from the displayed related images;

generating meta information related to the image data; and generating an image file comprising:
the image data of the subject,
the meta information, and
related image data information comprising at least related image data corresponding to the image data of the subject and meta information corresponding to the selected related image,
wherein the image data, the meta information, and the related image data information are associated with one another in the generated image file;

recording the image file;

causing, when an instruction signal instructing browsing of the image file is input from an external device, the external device to display the meta information and an image corresponding to image data;

additionally recording, when additional data related to image data is received from the external device, the additional data into the image file as new meta information;

determining, when the new meta information is additionally recorded into the image file, whether or not a volume of the image file exceeds a prescribed amount set beforehand; and compressing the image data when the prescribed amount is determined to be exceeded.

11. The nontransitory recording medium according to claim 10, wherein the program further instructs the processor provided in the information device communicatable via the network to:

record the generated image file recorded therein, and wherein the meta information comprises a plurality of pieces of meta information related to the image data, the image file has a prescribed volume, and the plurality of pieces of meta information include:

a plurality of pieces of additional change information that are additionally recordable with new information or changeable in its original information by an external device; and possibility information setting whether or not the additional recording of the new information or change in its original information by the external device is permitted.

12. The recording medium according to claim 11, wherein the plurality of pieces of additional change information are any of: comment information on the image data; related image data associated with the image data; and information on an address of the related image data associated with the image data, the address being on the network.

13. The nontransitory recording medium according to claim 11, wherein the plurality of pieces of additional change information further includes one or more of: copyright information of a shooter who imaged the image data; information on a position at which the image data were imaged; device identification information identifying a device that generated the image data; and volume information related to a volume of the image data.

14. The nontransitory recording medium according to claim 11, wherein the possibility information further has resize limitation information for resizing of the image data.

15. The nontransitory recording medium according to claim 10, wherein the meta information related to the image data includes a first possibility information setting whether or not the additional recording of the new information or change in its original information by an external device is permitted; and the meta information related to the image data includes a second possibility information prohibiting, when after the image file is transmitted via a network to an external device and the external device adds new meta information thereto or adjusts the meta information, according to the meta information, a file size of the image file upon shooting and a volume of the image file including the new or adjusted meta information, from exceeding a prescribed amount set beforehand.

* * * * *